(12) United States Patent
Janschitz et al.

(10) Patent No.: US 10,996,085 B2
(45) Date of Patent: May 4, 2021

(54) SENSOR ALIGNMENT USING HOMOGENEOUS TEST MODE

(71) Applicant: Infineon Technologies AG, Neubiberg (DE)

(72) Inventors: Johannes Janschitz, Villach (AT); Helmut Koeck, Villach (AT)

(73) Assignee: Infineon Technologies AG, Neubiberg (DE)

( * ) Notice: Subject to any disclaimer, the term of this patent is extended or adjusted under 35 U.S.C. 154(b) by 164 days.

(21) Appl. No.: 16/243,850

(22) Filed: Jan. 9, 2019

(65) Prior Publication Data
US 2020/0217694 A1 Jul. 9, 2020

(51) Int. Cl.
*G01D 18/00* (2006.01)
*G01D 5/16* (2006.01)
*G01D 5/14* (2006.01)

(52) U.S. Cl.
CPC ............ *G01D 18/00* (2013.01); *G01D 5/16* (2013.01); *G01D 5/145* (2013.01)

(58) Field of Classification Search
CPC .. G01D 5/00; G01D 5/12; G01D 5/14; G01D 5/142; G01D 5/145; G01D 5/16; G01D 18/00
USPC ...... 324/200, 207.11, 207.25, 602, 605, 607, 324/629, 631
See application file for complete search history.

(56) References Cited

U.S. PATENT DOCUMENTS

| | | | | |
|---|---|---|---|---|
| 6,973,916 B2 * | 12/2005 | Wayama | ............... | F02D 11/106 123/361 |
| 2001/0004849 A1 * | 6/2001 | Jin | ........................ | G01L 3/101 73/862.331 |
| 2007/0063696 A1 * | 3/2007 | Takahashi | .............. | G01D 5/145 324/207.25 |
| 2009/0058405 A1 * | 3/2009 | Oike | ...................... | G01L 5/221 324/207.25 |
| 2009/0179634 A1 * | 7/2009 | Nakazato | ............. | G01D 5/2451 324/207.25 |
| 2010/0066352 A1 * | 3/2010 | Takahashi | .............. | F16C 33/723 324/207.25 |
| 2010/0301845 A1 * | 12/2010 | Acker | ................ | B62D 15/0215 324/207.25 |
| 2010/0321008 A1 * | 12/2010 | Mita | ...................... | G01D 5/145 324/207.25 |
| 2012/0056617 A1 * | 3/2012 | Hirose | .................... | B60T 7/042 324/207.25 |

(Continued)

OTHER PUBLICATIONS

"MLX90372—Triaxis® Position Processor", file:///C:/Users/jcato/Downloads/MLX90372-Datasheet-Melexis%20(1).pdf, Mar. 23, 2018, 83 pages.

(Continued)

*Primary Examiner* — Hoai-An D. Nguyen
(74) *Attorney, Agent, or Firm* — Harrity & Harrity, LLP

(57) ABSTRACT

An alignment device may obtain a set of analog-to-digital converter (ADC) signals provided by an angle sensor operating in a homogeneous test mode. The set of ADC signals may be associated with a rotation of a target magnet relative to the angle sensor. The alignment device may identify a maximum ADC signal value based on the set of ADC signals. The alignment device may selectively position, by the alignment device, at least one of the angle sensor or the target magnet based on the maximum ADC signal value.

20 Claims, 12 Drawing Sheets

(56) References Cited

U.S. PATENT DOCUMENTS

2017/0045377 A1* 2/2017 Vallmajo I Ribas .. G01D 5/145

OTHER PUBLICATIONS

Continental "Continental Component Specification—Preliminary", Nov. 20, 2015, 32 pages.
AMS Datasheet, "AS5172A / AS5172B High-Resolution On-Axis Magnetic Angular Position Sensor with PS15 Output", [v1-05] Jul. 5, 2018, 85 pages.

* cited by examiner

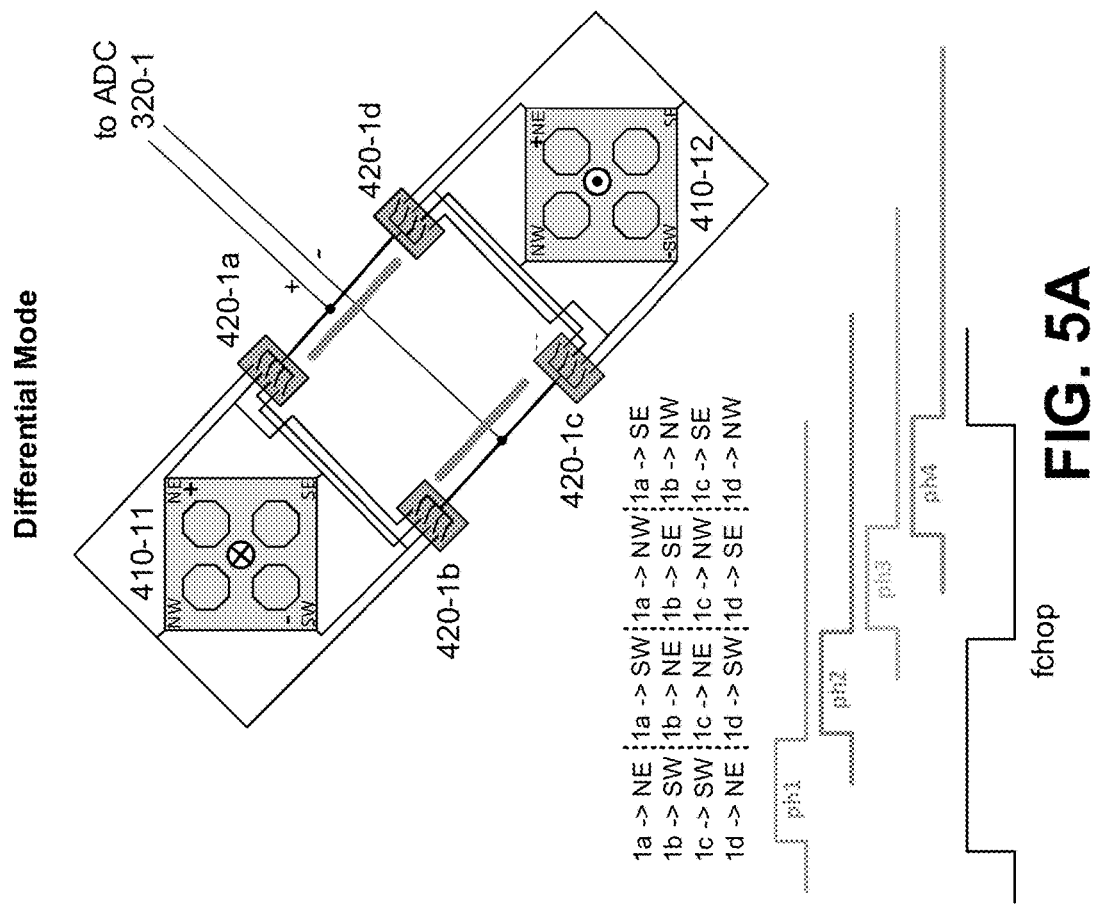

US 10,996,085 B2

SENSOR ALIGNMENT USING HOMOGENEOUS TEST MODE

BACKGROUND

A magnetic angle sensor may sense a magnetic field produced or distorted by a rotating magnet wheel, such as a disc magnet, a ring magnet, a rectangular magnet, a tooth wheel, and/or the like. The magnetic angle sensor may output, based on the sensed magnetic field, a signal that identifies an angular position of the magnet wheel.

SUMMARY

According to some possible implementations, a method may include obtaining, by an alignment device, a set of analog-to-digital converter (ADC) signals provided by an angle sensor operating in a homogeneous test mode, wherein the set of ADC signals is associated with a rotation of a target magnet relative to the angle sensor; identifying, by the alignment device, a maximum ADC signal value based on the set of ADC signals; and selectively positioning, by the alignment device, at least one of the angle sensor or the target magnet based on the maximum ADC signal value.

According to some possible implementations, a method may include rotating, by an alignment device, a target magnet to a first angular position relative to an angle sensor that is operating in a differential mode; switching, by the alignment device, the angle sensor from the differential mode to a homogeneous test mode; identifying, by the alignment device, a first ADC signal, provided by the angle sensor while operating in the homogeneous test mode, wherein the first ADC signal corresponds to an orthogonal angular position from the first angular position; selectively positioning, by the alignment device, at least one of the angle sensor or the target magnet along a first direction such that a value of the first ADC signal satisfies a condition; switching, by the alignment device, the angle sensor from the homogeneous test mode to the differential mode; rotating, by the alignment device, the target magnet to a second angular position relative to the angle sensor; switching, by the alignment device, the angle sensor from the differential mode to the homogeneous test mode; and selectively positioning, by the alignment device, at least one of the angle sensor or the target magnet along a second direction such that a value of a second ADC signal satisfies the condition.

According to some possible implementations, an angle sensor may include a first ADC, a second ADC, and a sensing component to operate in a homogeneous test mode, the sensing component including a first sensing element and a second sensing element associated with providing a first signal to the first ADC, wherein, when operating in the homogeneous test mode, a first plurality of switches, associated with the first sensing element and the second sensing element, is configured to cause differential magnetic field components, present at the first sensing element and the second sensing element, to be canceled out when providing the first signal; and also including a third sensing element and a fourth sensing element associated with providing a second signal to the second ADC, wherein, when operating in the homogeneous test mode, a second plurality of switches, associated with the third sensing element and the fourth sensing element, is configured to cause differential magnetic field components, present at the third sensing element and the fourth sensing element, to be canceled out when providing the second signal.

BRIEF DESCRIPTION OF THE DRAWINGS

FIGS. 5A and 5B are diagrams illustrating examples of the sensing component when configured to operate in a differential mode and a homogeneous test mode, respectively.

DETAILED DESCRIPTION

Figure 1:
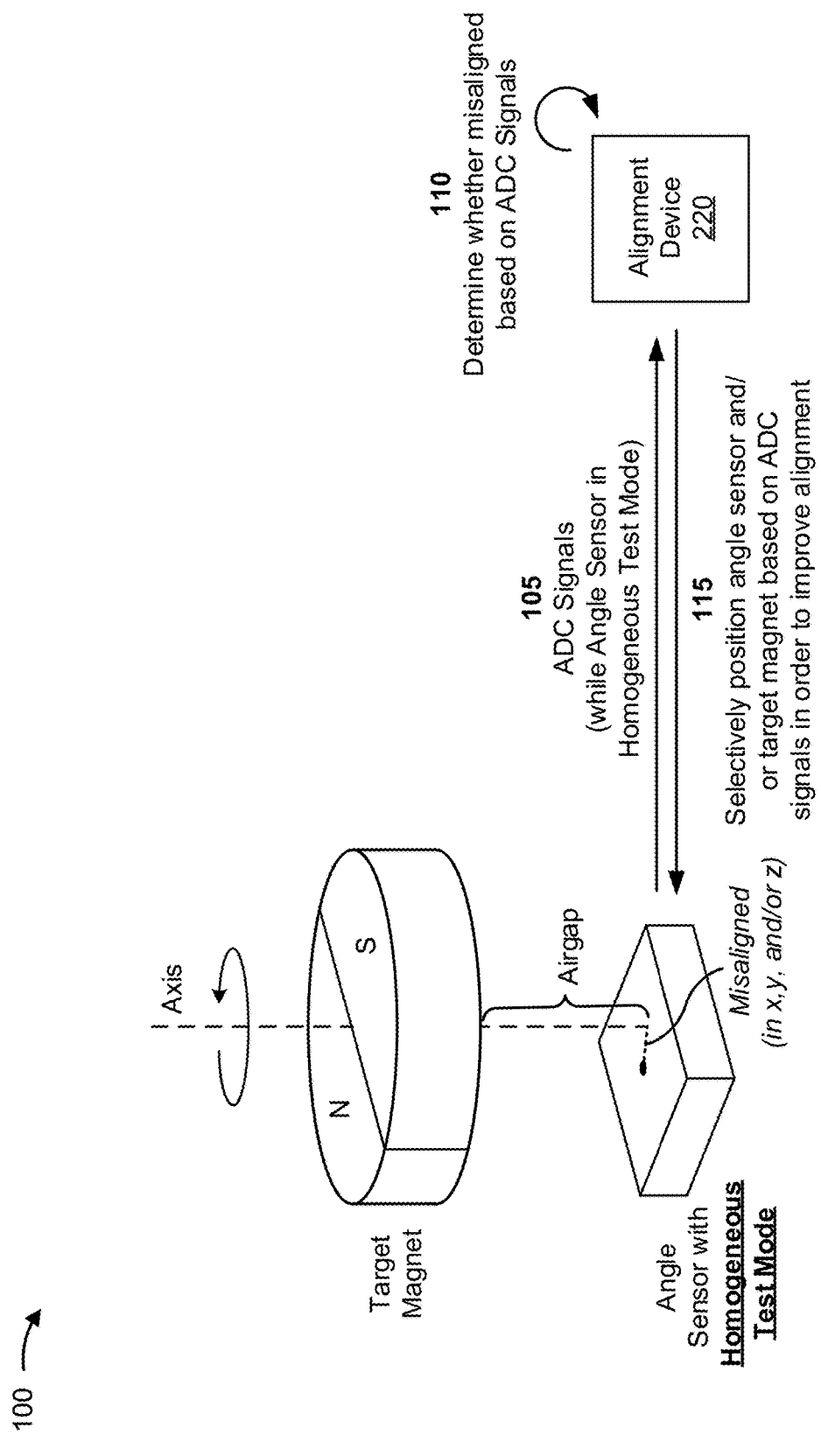
FIG. 1 is a diagram of an example of performing mechanical alignment using an angle sensor capable of operating in a homogeneous test mode, as described herein.

The following detailed description of example implementations refers to the accompanying drawings. The same reference numbers in different drawings may identify the same or similar elements.

A magnetic angle sensor (herein referred to as an angle sensor) may be required to perform an angular measurement with a particular accuracy. For example, in a given application, an angle sensor may be required to determine angular position with an angle error that is less than 2 degrees (°). One contributor to angle error in an angular measurement is mechanical misalignment between the angle sensor and a magnet for which the angular position is to be determined (herein referred to as a target magnet). The mechanical misalignment can be displacement in a plane of a sensing component of the angle sensor (e.g., displacement in an x-direction and/or displacement in a y-direction). For example, in an ideal arrangement, a magnetic center of the target magnet would be centered over the sensing component of the angle sensor. However, during system assembly, the angle sensor and/or the target magnet may be placed in an off-center position (e.g., such that the target magnet is not centered over the sensing component). The mechanical misalignment can also be displacement perpendicular to the plane of the sensing component (e.g., displacement in a z-direction). For example, in the ideal arrangement, a distance between the target magnet and the angle sensor (i.e., an airgap) may be a particular distance. However, during system assembly, the angle sensor and/or the target magnet may be placed at a distance that is smaller or larger than the particular distance.

In some cases, an error budget for a portion of angle error that is caused by mechanical misalignment may be selected such that some amount of mechanical misalignment is permitted in the angle error. In other words, a manufacturer may choose to accept some amount of angle error caused by mechanical misalignment, and may attempt to reduce portions of the angle error caused by other factors (e.g., a tilt angle between the sensing component and a package of the angle sensor, a tilt angle between the package and the target magnet, magnetization tilt, and/or the like). However, such a technique does not resolve mechanical misalignment, and reducing portions of the angle error caused by the other factors may be difficult and/or impossible. Thus, such an approach may not be feasible, particularly as accuracy requirements for angle sensors become more stringent.

Another approach to dealing with mechanical misalignment is to use multi-point calibration in order to allow angle error caused by mechanical misalignment to be calibrated out of an angular measurement. However, such an approach does not resolve the actual mechanical misalignment. Moreover, multi-point calibration adds cost to the angle sensor since on-chip sample point programming (e.g., as a look up table (LUT)) needs to be provided in the angle sensor, which may require additional memory (e.g., a larger electrically erasable programmable read-only memory (EEPROM) than would otherwise be required) and/or one or more additional or larger components. Further, during manufacturing, full revolution end-of-line (EOL) testing is required (e.g., a 360° rotation, comparison with a reference, calculation of sample point corrections, write commands to store calibration settings, and/or the like) in order to provide multi-point calibration. In some cases, such testing may not be possible (e.g., when the manufacturing process does not allow for such testing) and, even when possible, such testing can significantly increase cost and complexity of manufacturing.

Some implementations described herein provide an angle sensor capable of operating in a homogeneous test mode that allows optimal (or near-optimal) mechanical alignment between the angle sensor and a target magnet to be achieved. Methods for performing mechanical alignment using the angle sensor operating in the homogeneous test mode are described below. In some implementations, the use of the homogeneous test mode allows mechanical misalignment between the angle sensor and the target magnet to be reduced or eliminated. In this way, the mechanical misalignment can be addressed without requiring additional error budget or costly and complex multi-point calibration.

FIG. 1 is a diagram of an example 100 of performing mechanical alignment using an angle sensor capable of operating in a homogeneous test mode, as described herein.

As shown in FIG. 1, an angle sensor may be placed relative to a target magnet that is configured to rotate about an axis. However, as indicated, the angle sensor may be misaligned relative to the target magnet. For example, as shown, the angle sensor may be misaligned in an x-direction and/or a y-direction, both of which are on a plane corresponding to a surface of the angle sensor. As further shown, the angle sensor may be misaligned in the z-direction (e.g., such that an airgap between the angle sensor and the target magnet is larger or smaller than a desired distance).

As further shown in FIG. 1, the angle sensor is capable of operating in a homogeneous test mode. The homogeneous test mode is a mode of operation associated with aligning the angle sensor and the target magnet, as described herein. The angle sensor is also capable of operating in a differential mode. The differential mode is a mode of operation associated with performing an angular measurement using differential measurement principles.

In some implementations, when the angle sensor is operating in the homogeneous test mode and is optimally aligned with the target magnet, differential magnetic field components, present at a sensing component (e.g., including one or more sensing elements) of the angle sensor, cancel out in a set of analog-to-digital converter (ADC) signals provided by the angle sensor. For example, the sensing component may include a first pair of sensing elements associated with providing a first ADC signal (e.g., a sine signal), and a second pair of sensing elements associated with providing a second ADC signal (e.g., a cosine signal). Here, when the angle sensor is operating in the homogeneous test mode, a group of switches associated with the first pair of sensing elements is configured to cause differential magnetic field components, present at the first pair of sensing elements, to be canceled out in the first ADC signal. Similarly, a group of switches associated with the second pair of sensing elements is configured to cause differential magnetic field components, present at the second pair of sensing elements, to be canceled out in the second ADC signal. In some implementations, when the angle sensor is operating in the homogeneous test mode, homogeneous magnetic field components, present at the sensing component, are propagated in the first ADC signal and the second ADC signal.

Conversely, when the angle sensor is operating in the differential mode, homogeneous magnetic field components, present at the sensing component, cancel out in the set of ADC signals. For example, when the angle sensor is operating in the differential mode, the group of switches associated with the first pair of sensing elements is configured to cause homogeneous magnetic field components, present at the first pair of sensing elements, to be canceled out in the first ADC signal. Similarly, the group of switches associated with the second pair of sensing elements is configured to cause homogeneous magnetic field components, present at the second pair of sensing elements, to be canceled out in the second ADC signal. In some implementations, when the angle sensor is operating in the differential mode, differential magnetic field components, present at the sensing component, are propagated in the first ADC signal and the second ADC signal (e.g., such that a differential angular measurement can be performed based on the first ADC signal and the second ADC signal, as is known in the art).

Additional details regarding the angle sensor, configuration of the angle sensor for operation in the homogeneous mode, and configuration for operation of the angle sensor in the differential mode, are described below.

In some implementations, operation of the angle sensor in the homogeneous test mode may facilitate optimal or near-optimal mechanical alignment between the angle sensor and the target magnet. A general method for performing this mechanical alignment is illustrated in FIG. 1, while particular methods for performing mechanical alignment are described in further detail below.

In FIG. 1, the angle sensor may operate in the homogeneous test mode in association with performing mechanical alignment. For example, an alignment device (e.g., a device associated with managing or performing the mechanical alignment) may cause the angle sensor to operate in the homogeneous test mode (e.g., by sending a signal that causes the angle sensor to be configured to operate in the homogeneous test mode).

As shown by reference number 105, when the angle sensor is operating in the homogeneous test mode, the alignment device may obtain a set of ADC signals provided by the angle sensor (e.g., during a partial rotation of the target magnet or during a full rotation of the target magnet). An ADC signal may include a signal provided by an ADC of the angle sensor. In some implementations, the set of ADC signals may include a first ADC signal (e.g., a sine signal) and a second ADC signal (e.g., a cosine signal), as described in the above example.

As shown by reference number 110, the alignment device may determine, based on the set of ADC signals obtained while the angle sensor is operating in the homogeneous test mode, whether the angle sensor and the target magnet are misaligned (e.g., whether an amount of mechanical misalignment between the angle sensor and target magnet is acceptable, whether the angle sensor and the target magnet are in an optimal alignment, and/or the like). For example, the alignment device may determine whether a maximum value of one or more of the set of ADC signals satisfies a condition (e.g., is minimized, is below a particular value, and/or the like), which may be indicative of whether the angle sensor and the target magnet are misaligned. Examples of techniques for determining whether mechanical misalignment exists based on the set of ADC signals are described below with regard to FIGS. 8 and 10.

As shown by reference number 115, the alignment device may selectively position the angle sensor and/or the target magnet. For example, if the alignment device determines that the angle sensor and the target magnet are not misaligned (e.g., if maximum values of each of the ADC signals are minimized, if maximum values of each of the ADC signals are below a particular value, and/or the like), then the alignment device may maintain the position of the angle sensor and the target magnet (i.e., the alignment device may not cause the angle sensor or the target magnet to be repositioned). Conversely, if the alignment device determines that the angle sensor and the target magnet are misaligned (e.g., if a maximum value of at least one of the ADC signals is not minimized, if a maximum value of at least one of the ADC signals is above the particular value, and/or the like), then the alignment device may position the angle sensor and/or the target magnet (i.e., the alignment device may cause the angle sensor or the target magnet to be repositioned on the x-y plane). In some implementations, a direction in which the alignment device positions the angle sensor and/or the target magnet and/or an amount by which the alignment device positions the angle sensor and/or target magnet may be determined based on the set of ADC signals. Examples of techniques for positioning the angle sensor and/or the target magnet are described below with regard to FIGS. 8 and 10.

In this way, an angle sensor may be optimally (or near-optimally) aligned with a target magnet using a homogeneous test mode, thereby reducing or eliminating angle error attributable to mechanical misalignment between the angle sensor and the target magnet.

As indicated above, FIG. 1 is provided merely as an example. Other examples may differ from what is described with regard to FIG. 1.

Figure 2:
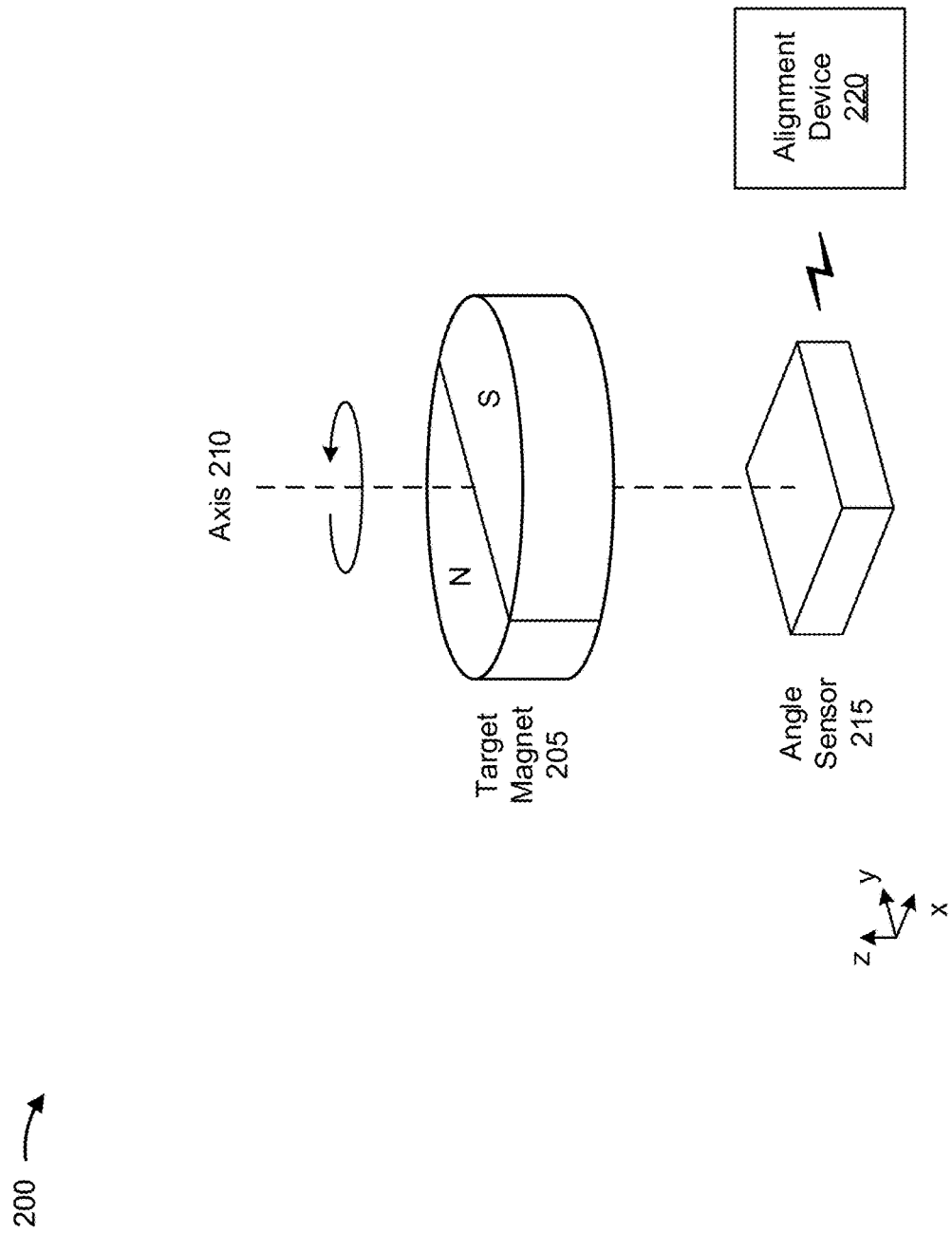
FIG. 2 is a diagram illustrating an example environment in which techniques and/or methods, described herein, may be implemented.

FIG. 2 is a diagram illustrating an example environment 200 in which techniques and/or methods described herein may be implemented. As shown in FIG. 2, environment 200 may include a target magnet 205 arranged to rotate about an axis 210, an angle sensor 215, and an alignment device 220.

Target magnet 205 includes one or more magnets positioned to rotate about axis 210. In some implementations, target magnet 205 may be connected (e.g., mechanically) to a rotatable object (not shown) such that a rotation angle of target magnet 205 corresponds to a rotation angle of the rotatable object (e.g., when there exists a non-slip relation between an end face of the rotatable object and target magnet 205).

In the example environment 200 shown in FIG. 2, target magnet 205 comprises a first half forming a north pole (N) and a second half forming a south pole (S), so that target magnet 205 comprises one pole pair. In some implementations, target magnet 205 may, without limitation, comprise more than one pole pair. In some implementations, target magnet 205 may include a disk magnet that is to be positioned concentrically about axis 210 that passes through the center of target magnet 205, as shown in FIG. 2. While target magnet 205 is shown as circular in FIG. 2, target magnet 205 may be another shape, such as a square, a rectangular, an ellipse, a ring, or the like. For example, target magnet 205 may be of an elliptical shape in an instance where an angle between a plane corresponding to a surface of target magnet 205 and axis 210 deviates from a substantially perpendicular relation. The plane may include a plane symmetrically cutting through target magnet 205 and including a magnet center of target magnet 205. In most practical cases, the plane may be substantially perpendicular to axis 210. As another example, target magnet 205 may include a ring magnet that is positioned to rotate about axis 210 (along with the rotatable object). A ring magnet may be of interest for an arrangement of target magnet 205 at an end of the rotatable object.

In some implementations, target magnet 205 may include two alternating poles on two portions of target magnet 205 (e.g., a north pole on a first half of target magnet 205, a south pole on a second half of target magnet 205). Additionally, or alternatively, target magnet 205 may include a dipole magnet (e.g., a dipole bar magnet, a circular dipole magnet, an elliptical dipole magnet, etc.), a permanent magnet, an electromagnet, a magnetic tape, or the like. Target magnet 205 may comprise a ferromagnetic material (e.g., Hard Ferrite), and may produce a magnetic field. Target magnet 205 may comprise a rare earth magnet which may be of advantage due to an intrinsically high magnetic field strength of rare earth magnets. As described above, in some implementations, target magnet 205 may be attached to or coupled with a rotatable object for which a rotation angle may be determined (e.g., by angle sensor 215) based on a rotation angle of target magnet 205.

Angle sensor 215 includes a device capable of detecting components of a magnetic field for use in determining an angle of rotation (e.g., of target magnet 205 and/or of a rotatable object to which target magnet 205 is connected). In some implementations, angle sensor 215 may include a sensing component associated with providing angle sensing functionality. For example, in some implementations, angle sensor 215 may include a group of sensing elements (e.g., included in an integrated circuit) configured to sense components of the magnetic field produced by target magnet 205 and present at angle sensor 215, and provide one or more signals indicative of the strength of the sensed magnetic field components.

As shown in FIG. 2, in some implementations, angle sensor 215 may be placed at a position relative to target magnet 205 such that angle sensor 215 can detect components of the magnetic field produced by target magnet 205.

In some implementations, angle sensor 215 may be capable of selectively operating in either a homogeneous test mode (e.g., a mode associated with aligning angle sensor 215 and target magnet 205) or a differential mode (e.g., a mode associated with performing an angular measurement), as described herein. Additional details regarding angle sensor 215 are described below with regard to FIGS. 3-6.

Alignment device 220 includes one or more devices capable of performing operations associated with aligning angle sensor 215 and target magnet 205, as described herein. For example, alignment device 220 may include a server, a group of servers, a user device (e.g., a smart phone, a tablet, a laptop computer, a desktop computer, and/or the like), and/or another type of device.

In some implementations, alignment device 220 may include a device capable of placing and/or positioning angle sensor 215 and/or target magnet 205 (e.g., a device capable of moving angle sensor 215 and/or target magnet 205 in association with reducing mechanical misalignment between angle sensor 215 and target magnet 205). For example, alignment device 220 may include a motorized XYZ (x-axis, y-axis, and z-axis) stage, a rotation table, a multi-axis tilt table and/or the like the like. Additionally, or alternatively, the system may be built on a set of position screws such that angle sensor 215 may be moved and/or repositioned relative to target magnet 205.

The number and arrangement of components and devices shown in FIG. 2 are provided as examples. In practice, there may be additional components and/or devices, fewer components and/or devices, different components and/or devices, or differently arranged components and/or devices than those shown in FIG. 2. Furthermore, two or more components and/or devices shown in FIG. 2 may be implemented within a single component or device, or a single component and/or a single device shown in FIG. 2 may be implemented as multiple, distributed components and/or devices. Additionally, or alternatively, a set of components (e.g., one or more components) and/or a set of devices (e.g., one or more devices) shown in FIG. 2 may perform one or more functions described as being performed by another set of components and/or devices.

Figure 3:
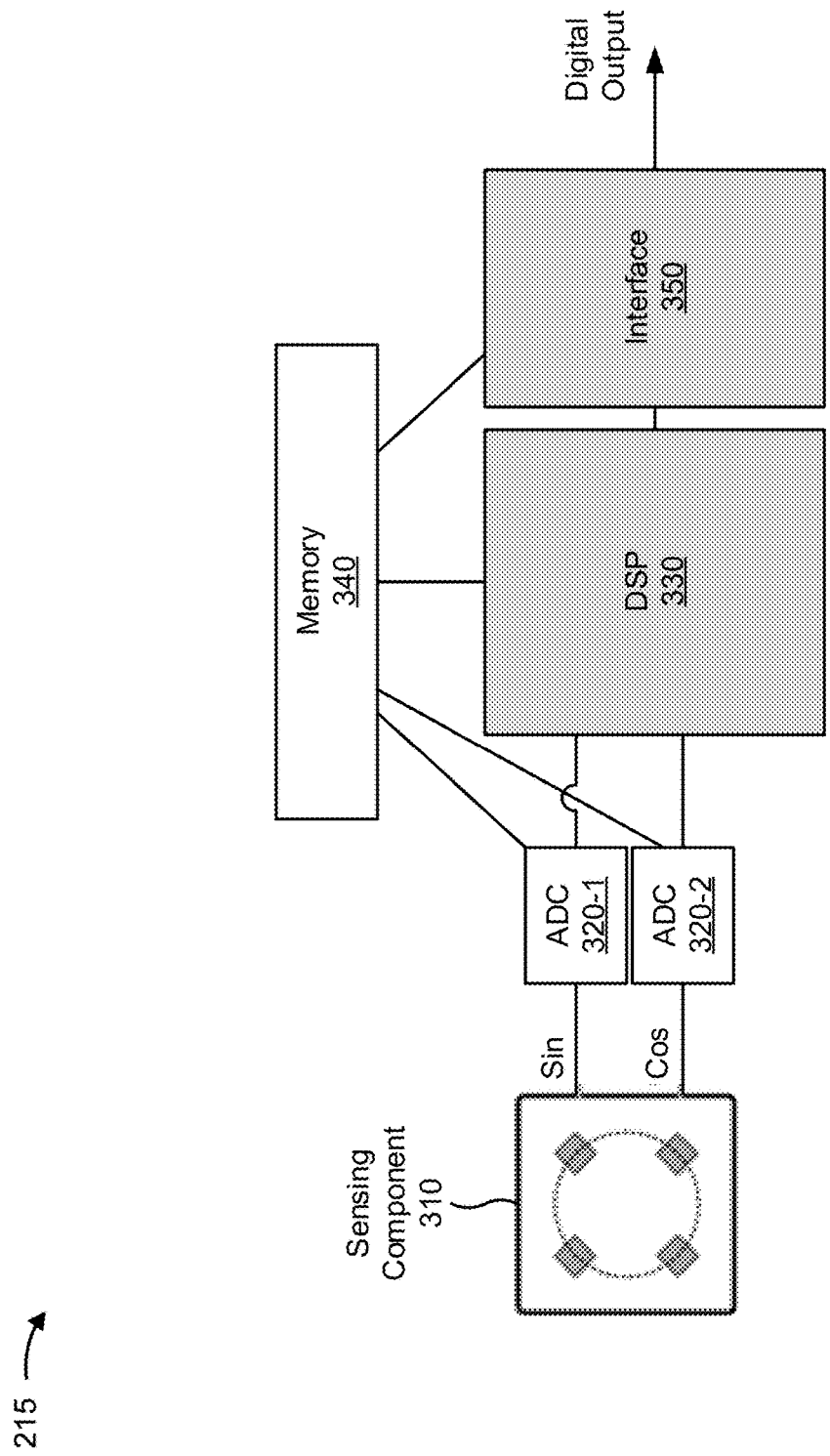
FIG. 3 is a diagram illustrating example components of the angle sensor described herein.

FIG. 3 is a diagram illustrating example components of angle sensor 215. As shown, angle sensor 215 may include a sensing component 310 (e.g., comprising a set of sensing elements), one or more ADCs 320 (e.g., ADC 320-1 and ADC 320-2 are shown in FIG. 3), a digital signal processor (DSP) 330, a memory component 340, and/or a digital interface 350.

Sensing component 310 includes a component comprising one or more sensing elements for sensing a magnetic field present at sensing component 310. For example, sensing component 310 may include one or more Hall-based sensing elements that operate based on a Hall effect. As another example, sensing component 310 may include one or more magnetoresistive (MR) based sensing elements, where the electrical resistance of the magnetoresistive material may depend on a strength and/or a direction of the magnetic field present at the magnetoresistive material. Here, sensing component 310 may operate based on an anisotropic magnetoresistance (AMR) effect, a giant magnetoresistance (GMR) effect, a tunnel magnetoresistance (TMR) effect, and/or the like. As an additional example, sensing component 310 may include one or more variable reluctance (VR) based sensing elements that operate based on induction.

In some implementations, sensing elements of sensing component 310 may be sensitive in a direction that is substantially perpendicular to a plane defined by sensing component 310 and/or a surface (e.g., a top surface, a bottom surface) of angle sensor 215. Such a direction is referred to herein as a z-direction. Additional details regarding sensing component 310 are described below in association with FIGS. 4A-4C.

ADC 320 includes an analog-to-digital converter that converts an analog signal from sensing component 310 to a digital signal. For example, ADC 320-1 may convert a first analog signal (e.g., a sine signal) received from sensing component 310, to a first digital signal to be processed by DSP 330. Similarly, ADC 320-2 may convert a second analog signal (e.g., a cosine signal) received from sensing component 310, to a second digital signal to be processed by DSP 330. In some implementations, ADC 320 may provide a digital signal to DSP 330. In some implementations, angle sensor 215 may include one or more ADCs 320.

DSP 330 may include a digital signal processing device or a collection of digital signal processing devices. In some implementations, DSP 330 may receive digital signals from ADC 320 and may process the digital signals to form output signals, such as output signals associated with an angular position of target magnet 205.

Memory component 340 includes a read only memory (ROM) (e.g., an EEPROM), a random access memory (RAM), and/or another type of dynamic or static storage device (e.g., a flash memory, a magnetic memory, an optical memory, etc.) that stores information and/or instructions for use by angle sensor 215. In some implementations, memory component 340 may store information associated with processing performed by DSP 330. Additionally, or alternatively, memory component 340 may store configurational values or parameters for sensing component 310 and/or information for one or more other components of angle sensor 215, such as ADC 320 or digital interface 350.

Digital interface 350 may include an interface via which angle sensor 215 may receive and/or provide information from and/or to another device, such as alignment device 220. For example, digital interface 350 may provide the output signal determined by DSP 330 to alignment device 220, and may receive information from alignment device 220.

The number and arrangement of components shown in FIG. 3 are provided as an example. In practice, there may be additional components, fewer components, different components, or differently arranged components than those shown in FIG. 3. For example, angle sensor 215 may include one or more components not shown in FIG. 3, such as a clock, an analog regulator, a digital regulator, a protection component, a temperature sensor, a stress sensor, and/or the like. Furthermore, two or more components shown in FIG. 3 may be implemented within a single component, or a single component shown in FIG. 3 may be implemented as multiple, distributed components. Additionally, or alternatively, a set of components (e.g., one or more components) shown in FIG. 3 may perform one or more functions described as being performed by another set of components.

Figure 4C:
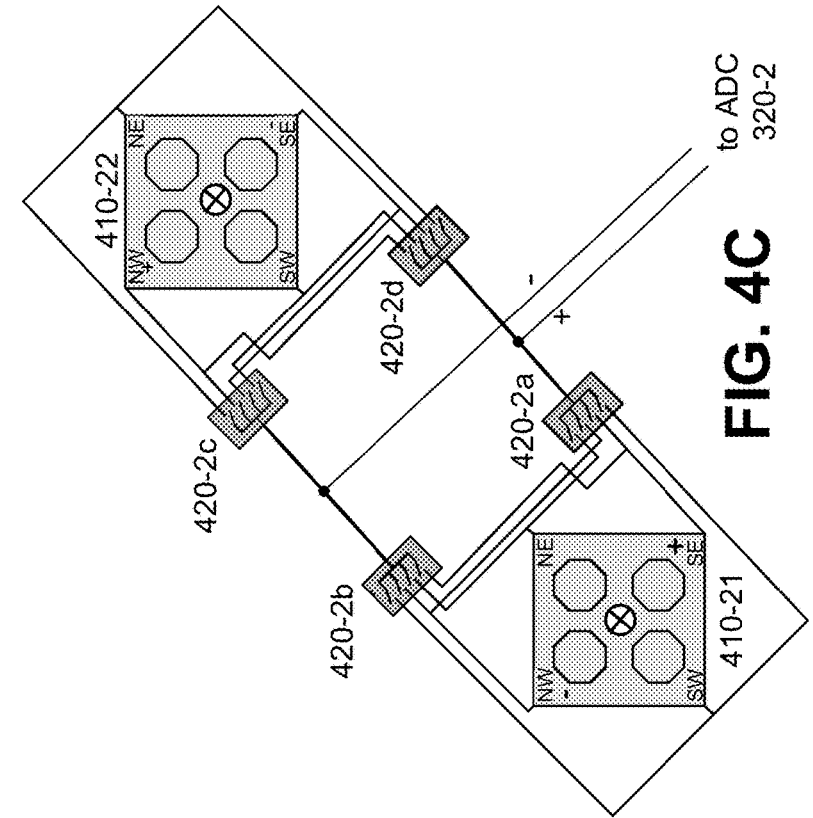
FIGS. 4A-4C are diagrams illustrating an example implementation of the sensing component of the angle sensor, as described herein.
Figure 4A:
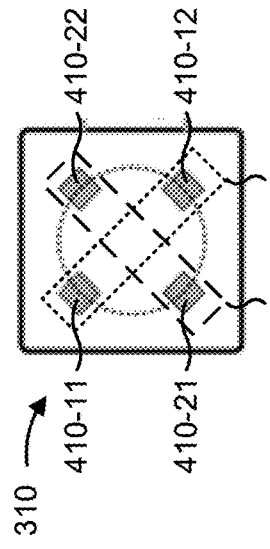
Figure 4B:
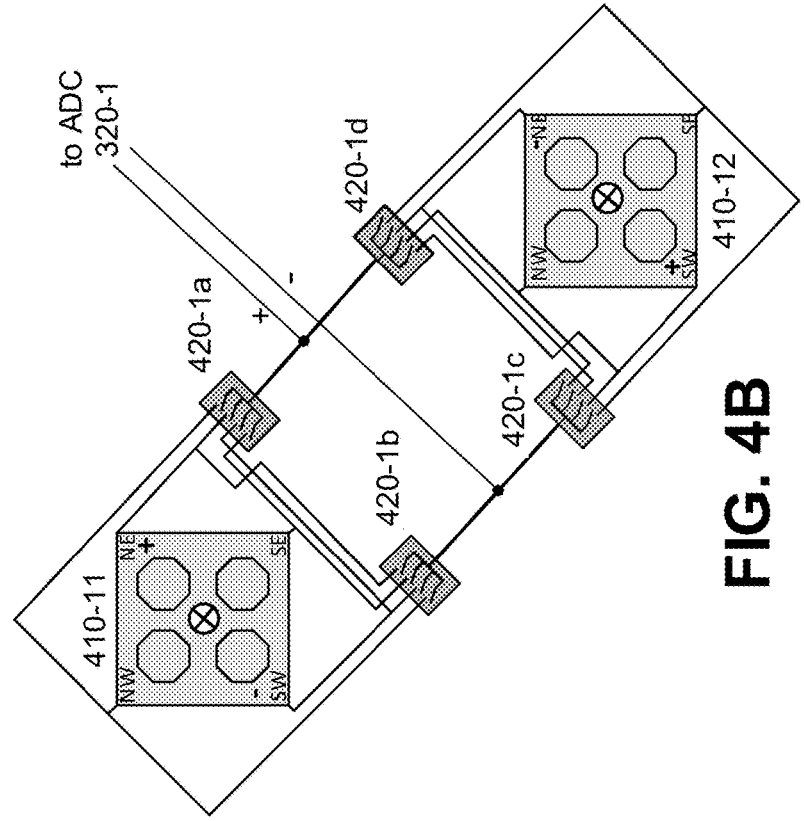

FIGS. 4A-4C are diagrams illustrating an example implementation of sensing component 310 of angle sensor 215. As shown in FIG. 4A, sensing component 310 may include two pairs of sensing elements 410 (e.g., a first pair including sensing elements 410-11 and 410-12, and a second pair including sensing elements 410-21 and 410-22). For example, sensing component 310 may include a first pair of quadruple Hall sensing elements and a second pair of quadruple Hall sensing elements (as illustrated in FIGS. 4B and 4C, respectively).

FIG. 4B is a diagram associated with the first pair of sensing elements 410 (sensing elements 410-11 and 410-12). In some implementations, as shown in FIG. 4B, terminals of each sensing element 410 of the first pair of sensing elements 410 are connected to a pair of switches 420. For example, a NE (+) terminal, a NW terminal, a SW (−) terminal, and a SE terminal of sensing element 410-11 are connected to switches 420-1*a* and 420-1*b*. Similarly, a NE (+) terminal, a NW terminal, a SW (−) terminal, and a SE terminal of sensing element 410-12 are connected to switches 420-1*c* and 420-1*d*. Notably, the polarity of sensing element 410-11 is opposite that of sensing element 410-12.

As shown by the arrangement in FIG. 4B, switch 420-1*a* controls which terminal of sensing element 410-11 contributes to a signal provided on a first line to ADC 320-1 (e.g., identified as the + line in FIG. 4B), and switch 420-1*b* controls which terminal of sensing element 410-11 contributes to a signal provided on a second line to ADC 320-1 (e.g., identified as the − line in FIG. 4B). Similarly, switch 420-1*d* controls which terminal of sensing element 410-12 contributes to the signal provided on the first line to ADC 320-1, and switch 420-1*c* controls which terminal of sensing element 410-12 contributes to the signal provided on the second line to ADC 320-1.

FIG. 4C is a diagram associated with the second pair of sensing elements 410 (sensing elements 410-21 and 420-22). In some implementations, as shown in FIG. 4C, terminals of each sensing element 410 of the second pair of sensing elements 410 are connected to pair of switches 420. For example, a NE terminal, a NW (−) terminal, a SW terminal, and a SE (+) terminal of sensing element 410-21 are connected to switches 420-2*a* and 420-2*b*. Similarly, a NE terminal, a NW (+) terminal, a SW terminal, and a SE (−) terminal of sensing element 410-22 are connected to switches 420-2*c* and 420-2*d*. Notably, the polarity of sensing element 410-21 is opposite that of sensing element 410-22.

As shown by the arrangement in FIG. 4C, switch 420-2*a* controls which terminal of sensing element 410-21 contributes to a signal provided on a first line to ADC 320-2 (e.g., identified as the + line in FIG. 4C), and switch 420-2*b* controls which terminal of sensing element 410-21 contributes to a signal provided on a second line to ADC 320-2 (e.g., identified as the − line in FIG. 4C). Similarly, switch 420-2*d* controls which terminal of sensing element 410-22 contributes to the signal provided on the first line to ADC 320-2, and switch 420-2*c* controls which terminal of sensing element 410-22 contributes to the signal provided on the second line to ADC 320-2.

Figure 5B:
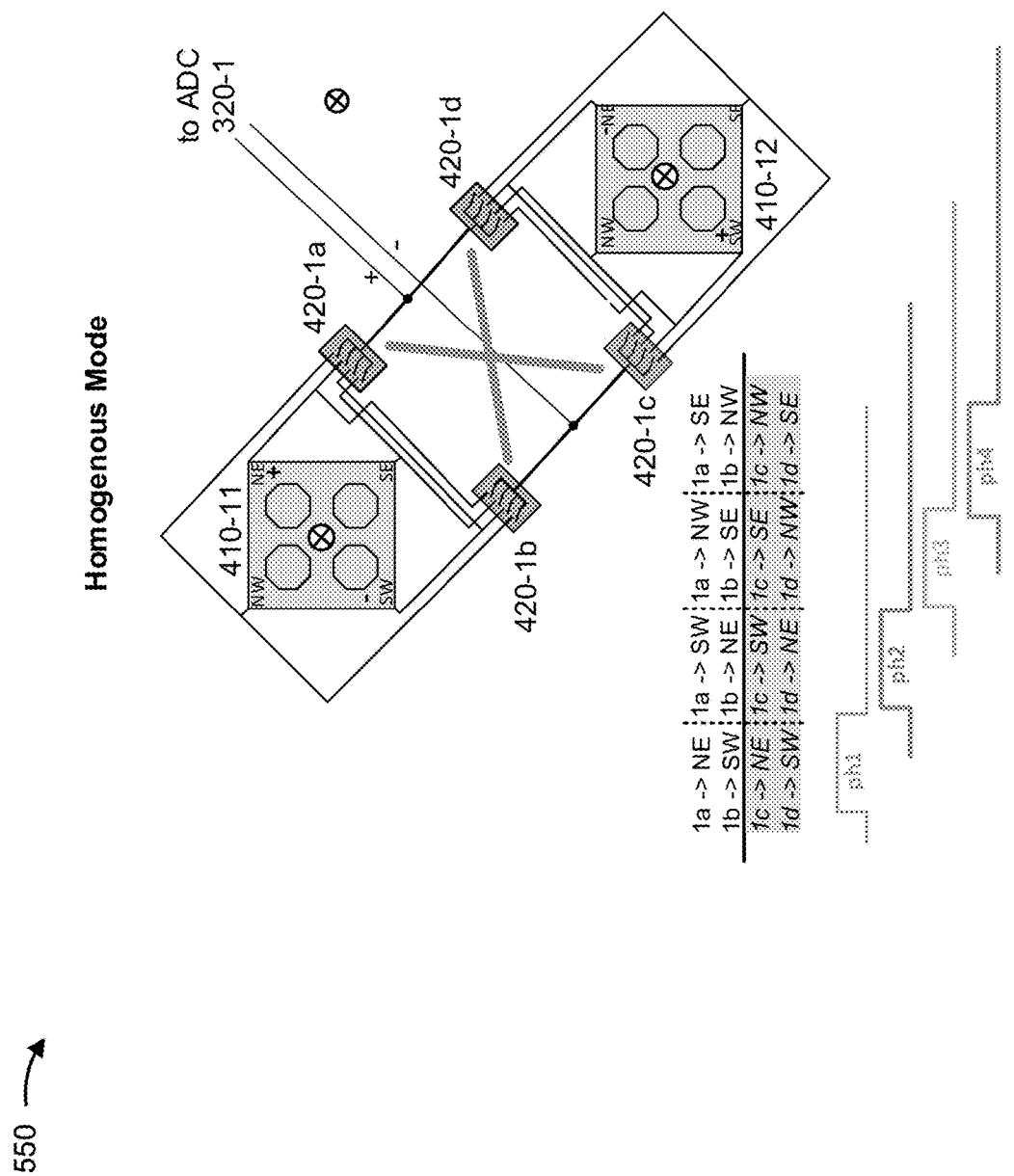

In some implementations, switches 420 of sensing component 310 may be configured to cause angle sensor 215 to operate in either the differential mode or the homogeneous test mode. FIGS. 5A and 5B are diagrams illustrating examples 500 and 550 of a pair of sensing elements 410 of sensing component 310 when configured to operate in the differential mode and the homogeneous test mode, respectively. Notably, while examples 500 and 550 show only the first pair of sensing elements 410 (e.g., sensing element 410-11 and sensing element 410-12), the second pair of sensing elements 410 (e.g., sensing element 410-21 and sensing element 410-22) may be configured in a similar manner as the first pair of sensing elements 410. The four phases (ph1 through ph4) illustrated in the tables of FIGS. 5A and 5B are spinning phases for cancelling offset and 1/f noise (i.e., pink noise) associated with sensing component 310, as is known in the art.

FIG. 5A is a diagram illustrating a pair of sensing elements 410 when configured to operate in the differential mode. As shown in FIG. 5A, during a first phase (ph1) when sensing component 310 is configured to operate in the differential mode, switch 420-1*a* connects the NE (+) terminal of sensing element 410-11 to the first line to ADC 320-1 (e.g., identified as the + line in FIG. 5A), and switch 420-1*d* connects the NE (+) terminal of sensing element 410-12 to the first line to ADC 320-1. As further shown, during the first phase, switch 420-1*b* connects the SW (−) terminal of sensing element 410-11 to the second line to ADC 320-1 (e.g., identified as the − line in FIG. 5A), and switch 420-1*c* connects the SW (−) terminal of sensing element 410-12 to the second line to ADC 320-1.

As further shown in FIG. 5A, during a second phase (ph2) when sensing component 310 is configured to operate in the differential mode, switch 420-1*a* connects the SW (−) terminal of sensing element 410-11 to the first line to ADC 320-1, and switch 420-1*d* connects the SW (−) terminal of sensing element 410-12 to the first line to ADC 320-1. As further shown, during the second phase, switch 420-1*b* connects the NE (+) terminal of sensing element 410-11 to the second line to ADC 320-1, and switch 420-1*c* connects the NE (+) terminal of sensing element 410-12 to the second line to ADC 320-1.

As further shown in FIG. 5A, during a third phase (ph3) when sensing component 310 is configured to operate in the differential mode, switch 420-1*a* connects the NW terminal of sensing element 410-11 to the first line to ADC 320-1, and switch 420-1*d* connects the SE terminal of sensing element 410-12 to the first line to ADC 320-1. As further shown, during the third phase, switch 420-1*b* connects the SE terminal of sensing element 410-11 to the second line to ADC 320-1, and switch 420-1*c* connects the NW terminal of sensing element 410-12 to the second line to ADC 320-1.

As further shown in FIG. 5A, during a fourth phase (ph4) when sensing component 310 is configured to operate in the differential mode, switch 420-1*a* connects the SE terminal of sensing element 410-11 to the first line to ADC 320-1, and switch 420-1*d* connects the NW terminal of sensing element 410-12 to the first line to ADC 320-1. As further shown, during the fourth phase, switch 420-1*b* connects the NW terminal of sensing element 410-11 to the second line to ADC 320-1, and switch 420-1*c* connects the SE terminal of sensing element 410-12 to the second line to ADC 320-1.

The configuration shown in FIG. 5A is a differential configuration that would yield, as an output to ADC 320-1, a differential voltage that is proportional to a Hall bias voltage (applied to sensing elements 410-11 and 410-12) and a magnetic flux present at sensing elements 410-11 and 410-12. In this differential configuration, magnetic field components with the same sign (i.e., homogeneous magnetic field components) would cancel out across the sense pins, thereby facilitating a differential measurement.

In some implementations, the configuration of switches 420 can be modified (e.g., based on an instruction from alignment device 220) in order to cause sensing component 310 to switch to the homogeneous test mode (e.g., in order to facilitate mechanical alignment between target magnet 205 and angle sensor 215).

FIG. 5B is a diagram illustrating a pair of sensing elements 410 configured to operate in the homogeneous test mode. As shown in FIG. 5B, during a first phase (ph1) when sensing component 310 is configured to operate in the homogeneous test mode, switch 420-1*a* connects the NE (+) terminal of sensing element 410-11 to the first line to ADC 320-1 (e.g., identified as the + line in FIG. 5B), and switch 420-1*d* connects the SW (+) terminal of sensing element 410-12 to the first line to ADC 320-1. As further shown, during the first phase, switch 420-1*b* connects the SW (−) terminal of sensing element 410-11 to the second line to ADC 320-1 (e.g., identified as the − line in FIG. 5B), and switch 420-1*c* connects the NE (−) terminal of sensing element 410-12 to the second line to ADC 320-1. Notably, as compared to the differential configuration shown in FIG. 5A, switch 420-1c connects the NE (−) terminal (rather than the SW (+) terminal) of sensing element 410-12 to the second line and switch 420-1d connects the SW (+) terminal (rather than the NE (−) terminal) to the second line during the first phase of operation (i.e., the connections at switches 420-1c and 420-1d are swapped).

As further shown in FIG. 5B, during a second phase (ph2) when sensing component 310 is configured to operate in the homogeneous test mode, switch 420-1a connects the SW (−) terminal of sensing element 410-11 to the first line to ADC 320-1, and switch 420-1d connects the NE (−) terminal of sensing element 410-12 to the first line to ADC 320-1. As further shown, during the second phase, switch 420-1b connects the NE (+) terminal of sensing element 410-11 to the second line to ADC 320-1, and switch 420-1c connects the SW (+) terminal of sensing element 410-12 to the second line to ADC 320-1. Again, as compared to the differential configuration shown in FIG. 5A, switch 420-1c connects the SW (+) terminal (rather than the NE (−) terminal) of sensing element 410-12 to the second line and switch 420-1d connects the NE (−) terminal (rather than the SW (+) terminal) to the second line during the second phase of operation.

As further shown in FIG. 5B, during a third phase (ph3) when sensing component 310 is configured to operate in the homogeneous test mode, switch 420-1a connects the NW terminal of sensing element 410-11 to the first line to ADC 320-1, and switch 420-1d connects the NW terminal of sensing element 410-12 to the first line to ADC 320-1. As further shown, during the third phase, switch 420-1b connects the SE terminal of sensing element 410-11 to the second line to ADC 320-1, and switch 420-1c connects the SE terminal of sensing element 410-12 to the second line to ADC 320-1. Again, as compared to the differential configuration shown in FIG. 5A, switch 420-1c connects the SE terminal (rather than the NW terminal) of sensing element 410-12 to the second line and switch 420-1d connects the NW terminal (rather than the SE terminal) to the second line during the third phase of operation.

As further shown in FIG. 5B, during a fourth phase (ph4) when sensing component 310 is configured to operate in the homogeneous test mode, switch 420-1a connects the SE terminal of sensing element 410-11 to the first line to ADC 320-1, and switch 420-1d connects the SE terminal of sensing element 410-12 to the first line to ADC 320-1. As further shown, during the fourth phase, switch 420-1b connects the NW terminal of sensing element 410-11 to the second line to ADC 320-1, and switch 420-1c connects the NW terminal of sensing element 410-12 to the second line to ADC 320-1. Again, as compared to the differential configuration shown in FIG. 5A, switch 420-1c connects the NW terminal (rather than the SE terminal) of sensing element 410-12 to the second line and switch 420-1d connects the SE terminal (rather than the NW terminal) to the second line during the fourth phase of operation.

The configuration shown in FIG. 5B causes homogenous magnetic fields to be propagated in the signals provided to ADC 320-1. Further, at an optimal position (e.g., when a magnetic center of target magnet 205 is centered over sensing component 310) differential fields would cancel out (rather than homogeneous magnetic field components canceling, as in the case of the configuration shown in FIG. 5A). In other words, in this homogeneous configuration, magnetic field components with different signs would cancel out across the sense pins, thereby facilitating optimal or near-optimal alignment using the processes described herein.

The number and arrangement of components shown in FIGS. 4A-4C, 5A, and 5B are provided as an example. In practice, there may be additional components, fewer components, different components, or differently arranged components than those shown in FIGS. 4A-4C, 5A, and 5B. Furthermore, two or more components shown in FIGS. 4A-4C, 5A, and 5B may be implemented within a single component, or a single component shown in FIGS. 4A-4C, 5A, and 5B may be implemented as multiple, distributed components. In other words, FIGS. 4A-4C, 5A, and 5B are provided merely as examples. Other examples may differ from what was described with regard to FIGS. 4A-4C, 5A, and 5B.

Figure 6:
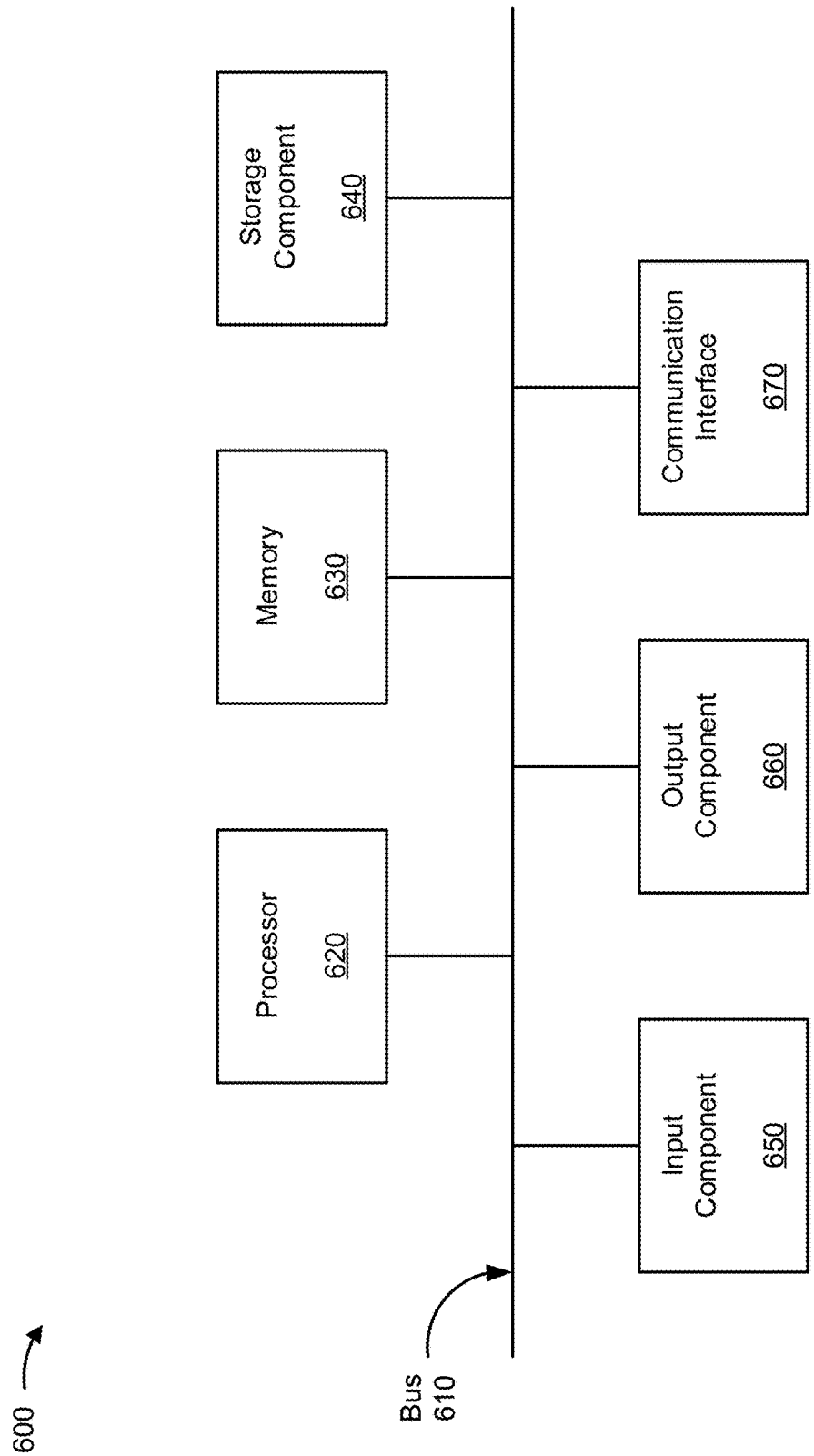
FIG. 6 is a diagram of example components of the alignment device described herein.

FIG. 6 is a diagram of example components of a device 600. Device 600 may correspond to alignment device 220. In some implementations, alignment device 220 may include one or more devices 600 and/or one or more components of device 600. As shown in FIG. 6, device 600 may include a bus 610, a processor 620, a memory 630, a storage component 640, an input component 650, an output component 660, and a communication interface 670.

Bus 610 includes a component that permits communication among multiple components of device 600. Processor 620 is implemented in hardware, firmware, and/or a combination of hardware and software. Processor 620 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 620 includes one or more processors capable of being programmed to perform a function. Memory 630 includes a random access memory (RAM), a read only memory (ROM), and/or another type of dynamic or static storage device (e.g., a flash memory, a magnetic memory, and/or an optical memory) that stores information and/or instructions for use by processor 620.

Storage component 640 stores information and/or software related to the operation and use of device 600. For example, storage component 640 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 650 includes a component that permits device 600 to receive information, such as via user input (e.g., a touch screen display, a keyboard, a keypad, a mouse, a button, a switch, and/or a microphone). Additionally, or alternatively, input component 650 may include a sensor for sensing information (e.g., a global positioning system (GPS) component, an accelerometer, a gyroscope, and/or an actuator). Output component 660 includes a component that provides output information from device 600 (e.g., a display, a speaker, and/or one or more light-emitting diodes (LEDs)).

Communication interface 670 includes a transceiver-like component (e.g., a transceiver and/or a separate receiver and transmitter) that enables device 600 to communicate with other devices, such as via a wired connection, a wireless connection, or a combination of wired and wireless connections. Communication interface 670 may permit device 600 to receive information from another device and/or provide information to another device. For example, communication interface 670 may include an Ethernet interface, an optical interface, a coaxial interface, an infrared interface, a radio frequency (RF) interface, a universal serial bus (USB) interface, a Wi-Fi interface, a cellular network interface, and/or the like.

Device 600 may perform one or more processes described herein. Device 600 may perform these processes based on processor 620 executing software instructions stored by a non-transitory computer-readable medium, such as memory 630 and/or storage component 640. A computer-readable medium is defined herein as a non-transitory memory device. A memory device includes memory space within a single physical storage device or memory space spread across multiple physical storage devices.

Software instructions may be read into memory 630 and/or storage component 640 from another computer-readable medium or from another device via communication interface 670. When executed, software instructions stored in memory 630 and/or storage component 640 may cause processor 620 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 6 are provided as an example. In practice, device 600 may include additional components, fewer components, different components, or differently arranged components than those shown in FIG. 6. Additionally, or alternatively, a set of components (e.g., one or more components) of device 600 may perform one or more functions described as being performed by another set of components of device 600.

Figure 7:
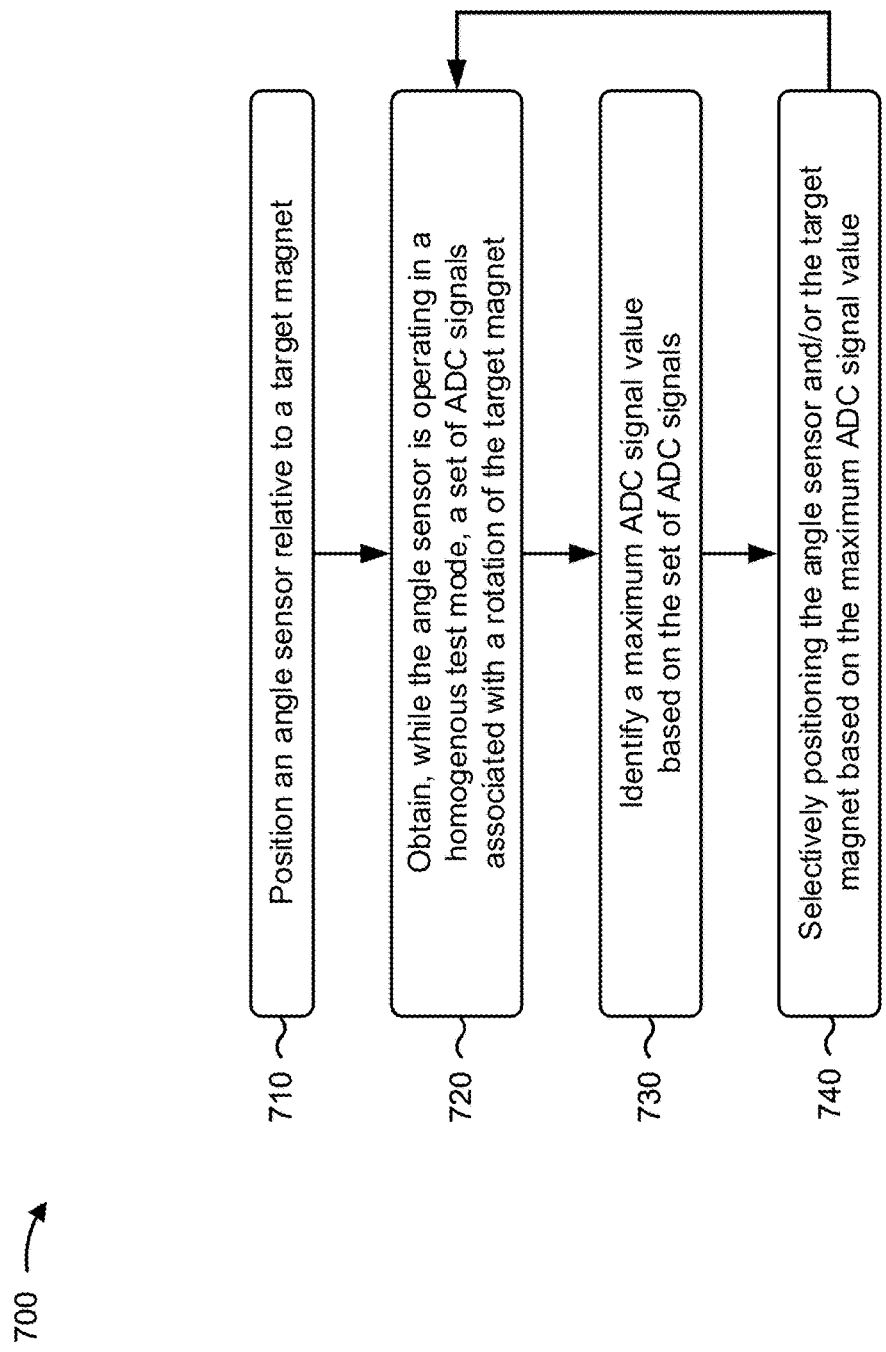
FIG. 7 is a flow chart of an example process for performing mechanical alignment using an angle sensor operating in a homogeneous test mode and a full rotation of a target magnet, as described herein.

FIG. 7 is a flow chart of an example process 700 for performing mechanical alignment using angle sensor 215 operating in the homogeneous test mode and a full rotation of target magnet 205. In some implementations, one or more process blocks of FIG. 7 may be performed by alignment device 220. Additionally, or alternatively, one or more process blocks of FIG. 7 may be performed by another device, such as angle sensor 215.

As shown in FIG. 7, process 700 may include positioning an angle sensor relative to a target magnet (block 710). For example, alignment device 220 may position angle sensor 215 relative to target magnet 205. The position of angle sensor 215 relative to target magnet 205 after initial placement of angle sensor 215 and/or target magnet 205 is referred to as the initial position.

As further shown in FIG. 7, process 700 may include obtaining, while the angle sensor is operating in a homogeneous test mode, a set of ADC signals associated with a rotation of the target magnet (block 720). For example, alignment device 220 may obtain, while angle sensor 215 is operating in the homogeneous test mode, a set of ADC signals associated with a rotation of target magnet 205 while target magnet 205 and angle sensor 215 are in the initial position.

In some implementations, alignment device 220 may cause angle sensor 215 to operate in the homogeneous test mode. For example, alignment device 220 may provide, to angle sensor 215, information (e.g., an instruction) indicating that angle sensor 215 is to operate in the homogeneous test mode, and angle sensor 215 may be configured accordingly (e.g., by causing switches 420 of sensing component 310 to be configured as described in association with FIG. 5B).

While angle sensor 215 is operating in the homogeneous test mode, target magnet 205 may be caused (e.g., by alignment device 220 or another device) to perform at least one full rotation (e.g., a rotation of at least approximately 360°) about axis 205. During this rotation, a set of (sinusoidal) ADC signals provided by ADCs 320 of angle sensor 215 (e.g., ADC 320-1 and ADC 320-2) may be provided to alignment device 220. In some implementations, the set of ADC signals includes a pair of ADC signals (e.g., a first ADC signal provided by ADC 320-1 and a second ADC signal provided by ADC 320-2). Here, since angle sensor 215 is operating in the homogeneous test mode, the set of ADC signals includes information associated with homogeneous magnetic field components present at sensing component 310 (e.g., the homogeneous magnetic field components are not canceled). Further, in a case where angle sensor 215 is not optimally aligned with target magnet 205, differential magnetic field components are propagated in the set of ADC signals.

As further shown in FIG. 7, process 700 may include identifying a maximum ADC signal value based on the set of ADC signals (block 730). For example, alignment device 220 may identify a maximum ADC signal value based on the set of ADC signals.

In some implementations, the maximum ADC signal value is a maximum absolute value reached by any of the set of ADC signals. Thus, the maximum ADC signal value can be associated with an ADC signal provided by ADC 320-1 or an ADC signal provided by ADC 320-2. Here, peaks and valleys in a given sinusoidal ADC signal are caused by mechanical misalignment between target magnet 205 and angle sensor 215 and, therefore, the maximum ADC signal value is indicative of an angular position at which the mechanical misalignment is most impactful on angle sensor 215.

As further shown in FIG. 7, process 700 may include selectively positioning the angle sensor and/or the target magnet based on the maximum ADC signal value (block 740). For example, alignment device 220 may selectively position angle sensor 215 and/or target magnet 205 based on the maximum ADC signal value.

In some implementations, alignment device 220 may selectively position angle sensor 215 and/or target magnet 205 based on whether the maximum ADC signal value satisfies a condition. In some implementations, the condition may be whether the maximum ADC signal value is minimized. For example, the condition may be whether the maximum ADC signal value has reached an acceptable local minimum, a derivative with an acceptably low value (e.g., where the derivative would be zero at the actual minimum), and/or the like. Additionally, or alternatively, the condition may be whether the maximum value of the ADC signal is at or below a particular value. The particular value may be, for example, a value of the ADC signal at or below which an amount of angle error resulting from mechanical misalignment would be acceptable or permissible (e.g., less than 2°, less than 1°, less than 0.5°, less than 0.2°, less than 0.1°, and the like).

In some implementations, the selective positioning of angle sensor 215 or target magnet 205 may include rotating target magnet 205 to an angular position that corresponds to the maximum ADC signal value, and/or positioning angle sensor 215 and/or target magnet 205 along a particular direction in order to reduce the maximum ADC signal value. For example, alignment device 220 may cause target magnet 205 to rotate to an angular position that corresponds to the maximum ADC signal value. Next, alignment device 220 may reposition angle sensor 215 and/or target magnet 205 (back-and-forth) along a direction while monitoring the ADC signal. In some implementations, the direction in which alignment device 220 repositions angle sensor 215 and/or target magnet 205 may be a direction on the x-y plane that is substantially perpendicular to a magnetic axis of target magnet 205, while target magnet 205 is in the angular position corresponding to the maximum ADC signal value. Here, alignment device 220 may reposition angle sensor 215 and/or target magnet 205 until alignment device 220 determines that a value of the ADC signal satisfies the condition (e.g., is minimized, or is at or below a particular value). When alignment device 220 determines that the value of the ADC signal at the position corresponding to the maximum ADC signal value satisfies the condition, alignment device 220 may stop repositioning angle sensor 215 and/or target magnet 205.

In some implementations, after alignment device 220 positions angle sensor 215 and/or target magnet 205 along the direction (e.g., in order to reduce the maximum ADC signal value), alignment device 220 may repeat process blocks 720-740. For example, after repositioning angle sensor 215 and/or target magnet 205 along the direction as described above, alignment device 220 may obtain another set of ADC signals provided by angle sensor 215 during another rotation of target magnet 205 (while angle sensor 215 operates in the homogeneous test mode). Here, alignment device 220 may identify another maximum ADC signal value based on the other set of ADC signals, and may selectively position angle sensor 215 and/or target magnet 205 based on the other maximum ADC signal value, in a manner similar to that described above. In this way, multiple iterations of example process 700 may be performed in order to provide optimal or near-optimal mechanical alignment between angle sensor 215 and target magnet 205.

In some implementations, the selective positioning of angle sensor 215 and/or target magnet 205 may include maintaining a position of angle sensor 215 and target magnet 205. For example, alignment device 220 may determine (without further rotation of target magnet 205) that the maximum ADC signal value satisfies the condition, indicating that target magnet 205 and angle sensor 215 are optimally or near-optimally aligned. In such a case, alignment device 220 may not cause target magnet 205 and/or angle sensor 215 to be repositioned. In other words, when the maximum ADC signal value satisfies the condition, alignment device 220 may cause a position of target magnet 205 and angle sensor 215 to be maintained.

In some implementations, after aligning angle sensor 215 and target magnet 205 in the x-y plane, alignment device 220 may selectively adjust an airgap between angle sensor 215 and target magnet 205. For example, alignment device 220 may provide, to angle sensor 215, information (e.g., an instruction) indicating that angle sensor 215 is to operate in the differential mode, and angle sensor 215 may be configured accordingly (e.g., by causing switches 420 of sensing component 310 to be configured as described in association with FIG. 5A). Next, alignment device 220 may selectively adjust an airgap between target magnet 205 and angle sensor 215 based on another set of ADC signals provided by angle sensor 215 while operating in the differential mode. For example, an absolute value of an amplitude (vector length) can be calculated from the other set of ADC signals as follows:

$$\text{vec\_len} = \sqrt{ADC1^2 + ADC2^2}$$

where vec_len is the vector length, ADC1 is a value of an ADC signal provided by ADC 320-1, and ADC2 is a value of an ADC signal provided by ADC 320-2. Here, the vector length is indicative of a size of the airgap between angle sensor 215 and target magnet 205. Thus, angle sensor 215 and/or target magnet 205 can be positioned in the z-direction in order to cause the vector length to increase or decrease such that the vector length corresponds to a desired airgap size.

In some implementations, after alignment device 220 selectively repositions angle sensor 215 and/or target magnet 205 such that optimal or near-optimal alignment has been reached, alignment device 220 may provide an indication that angle sensor 215 is aligned with target magnet 205. For example, alignment device 220 may provide the indication to a user device associated with the manufacturer (e.g., in order to notify the manufacturer that optimal or near-optimal alignment has been achieved) or to another device associated with the manufacturer (e.g., such that a next step in the manufacturing process can be triggered).

In this way, alignment device 220 may use angle sensor 215, operating in a homogeneous test mode, in order to achieve optimal or near-optimal alignment of angle sensor 215 and target magnet 205.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

Figure 8:
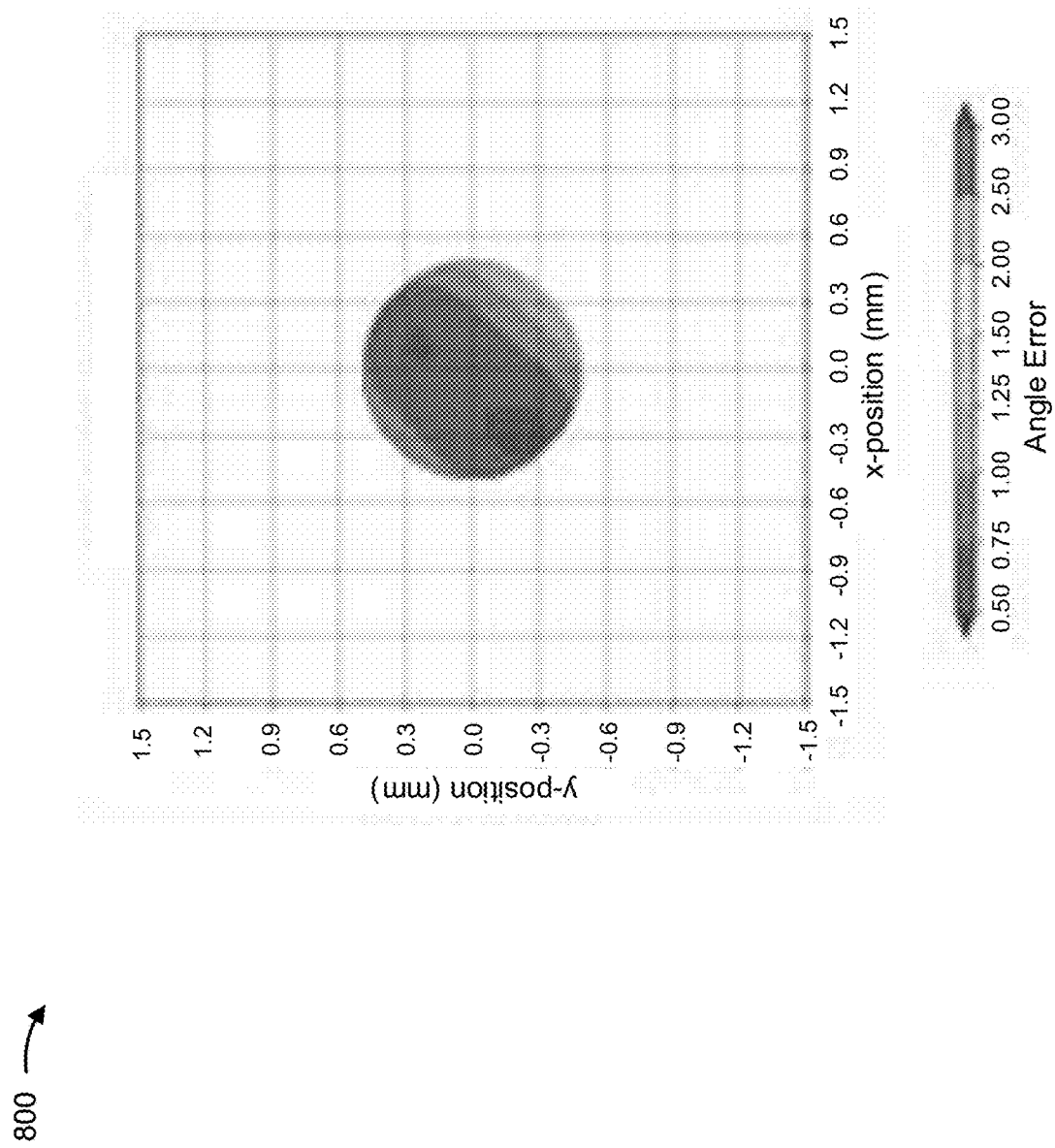
FIG. 8 is a diagram illustrating an example of angle error distribution achieved using the alignment process described by the example process of FIG. 7.

FIG. 8 is a diagram illustrating an example 800 of angle error distribution achieved using the alignment process described by example process 700. As shown in FIG. 8, at a position of optimal alignment (i.e., a point defined by the 0.0 millimeter (mm) x-position and the 0.0 mm y-position) and at positions of near-optimal alignment (e.g., within a radius of approximately 0.50 mm from the position of optimal alignment) the amount of angle error is below approximately 1.50° and, in some cases, is less than or equal to approximately 0.50°.

As indicated above, FIG. 8 is provided merely as an example. Other examples may differ from what is described with regard to FIG. 8.

In some implementations, performing at least a full rotation (e.g., a rotation of at least approximately 360° of target magnet 205 in association with aligning angle sensor 215 and target magnet 205, as required by example process 700, may be undesirable (e.g., in terms of cost and/or time), difficult, or even impossible.

Figure 9:
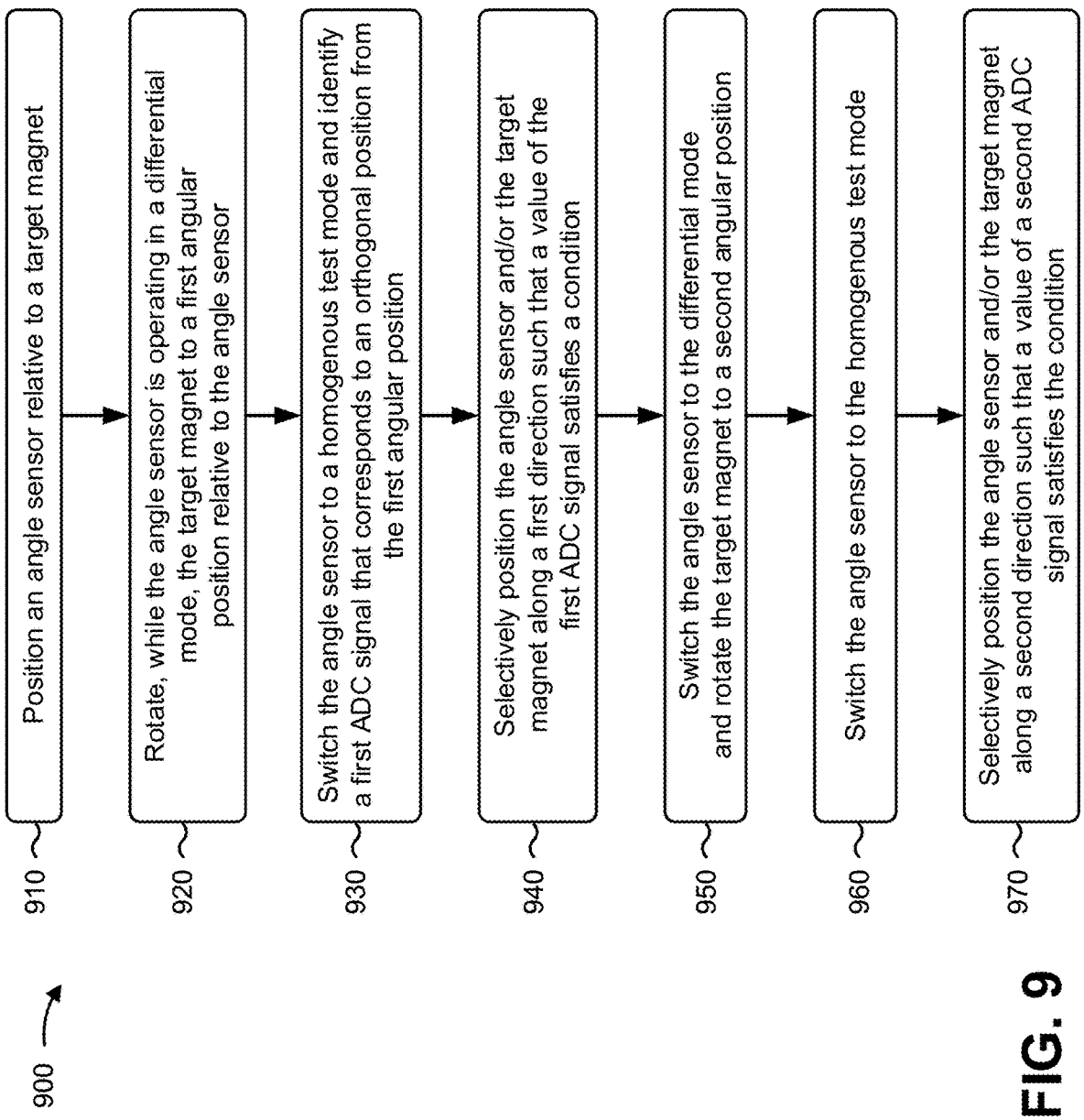
FIG. 9 is a flow chart of another example process for performing mechanical alignment using an angle sensor operating in a homogeneous test mode and a partial rotation of a target magnet, as described herein.

FIG. 9 is a flow chart of an example process 900 for performing mechanical alignment using angle sensor 215 operating in the homogeneous test mode and a partial rotation of target magnet 205. In some implementations, one or more process blocks of FIG. 9 may be performed by alignment device 220. Additionally, or alternatively, one or more process blocks of FIG. 9 may be performed by another device, such as angle sensor 215.

As shown in FIG. 9, process 900 may include positioning an angle sensor relative to a target magnet (block 910). For example, alignment device 220 may position angle sensor 215 relative to target magnet 205. The position of angle sensor 215 relative to target magnet 205 after initial placement of angle sensor 215 and/or target magnet 205 is referred to as the initial position.

As shown in FIG. 9, process 900 may include rotating the target magnet to a first angular position relative to the angle sensor that is operating in a differential mode (block 920). For example, alignment device 220 may rotate target magnet 205 to a first angular position relative to angle sensor 215 that is operating in the differential mode.

In some implementations, alignment device 220 may cause angle sensor 215 to operate in the differential mode. For example, alignment device 220 may provide, to angle sensor 215, information (e.g., an instruction) indicating that angle sensor 215 is to operate in the differential mode, and angle sensor 215 may be configured accordingly (e.g., by causing switches 420 of sensing component 310 to be configured as described in association with FIG. 5A).

In some implementations, alignment device 220 may identify the first angular position based on a set of ADC signals obtained from angle sensor 215 while angle sensor 215 is operating in the differential mode. In some implementations, the first angular position is a position at which values of each of the set of ADC signals match (e.g., are approximately equal to one another) while angle sensor 215 operates in the differential mode. For example, the first angular position may correspond to a position at which a value of a sine signal provided by ADC 320-1 matches a value of a cosine signal provided by ADC 320-2. In some implementations, the first angular position is a 45° angular position of target magnet 205 relative to angle sensor 215 or a 225° angular position of target magnet 205 relative to angle sensor 215. In some implementations, at the first angular position, a magnetic axis of target magnet 205 is approximately aligned with a pair of sensing elements 410 of sensing component 310 on the x-y plane.

As further shown in FIG. 9, process 900 may include switching the angle sensor from the differential mode to the homogeneous test mode and identifying a first ADC signal that corresponds to an orthogonal angular position that is orthogonal to the first angular position (block 930). For example, alignment device 220 may switch angle sensor 215 from the differential mode to the homogeneous test mode and may identify a first ADC signal that corresponds to an orthogonal angular position that is orthogonal to the first angular position.

In some implementations, alignment device 220 may cause angle sensor 215 to switch to the homogeneous test mode from the differential mode. For example, alignment device 220 may provide, to angle sensor 215, information (e.g., an instruction) indicating that angle sensor 215 is to operate in the homogeneous test mode, and angle sensor 215 may be configured accordingly (e.g., by causing switches 420 of sensing component 310 to be configured as described in association with FIG. 5B).

In some implementations, the first ADC signal is a signal that measures the orthogonal angular position that is orthogonal to the first angular position. For example, when target magnet 205 is in the first angular position such that the magnetic axis of target magnet 205 is aligned with one pair of sensing elements 410 of sensing component 310, the first ADC signal is an ADC signal provided by ADC 320 associated with another pair of sensing elements 410.

As further shown in FIG. 9, process 900 may include selectively positioning the angle sensor and/or the target magnet in a first direction such that a value of the first ADC signal satisfies a condition (block 940). For example, alignment device 220 may selectively position angle sensor 215 and/or target magnet 205 in a first direction such that a value of the first ADC signal satisfies a condition.

In some implementations, alignment device 220 may selectively position angle sensor 215 and/or target magnet 205 based on whether the value of the first ADC signal value satisfies the condition. In some implementations, the condition may be whether the value of the first ADC signal value is minimized, or whether the value of the first ADC signal is at or below a particular value, as described above in association with example process 700.

In some implementations, the selective positioning of angle sensor 215 or target magnet 205 may include positioning angle sensor 215 and/or target magnet 205 along the first direction in order to reduce the ADC signal value. For example, alignment device 220 may reposition angle sensor 215 and/or target magnet 205 (back-and-forth) along the first direction while monitoring the first ADC signal. Here, the first direction is a direction on the x-y plane that is substantially perpendicular to the magnetic axis of target magnet 205 while target magnet 205 is in the first angular position. In some implementations, alignment device 220 may reposition angle sensor 215 and/or target magnet 205 along the first direction until alignment device 220 determines that a value of the first ADC signal satisfies the condition (e.g., is minimized, or is at or below a particular value). When alignment device 220 determines that the value of the first ADC signal satisfies the condition, alignment device 220 may stop repositioning angle sensor 215 and target magnet 205 in the first direction.

In some implementations, alignment device 220 may selectively position angle sensor 215 and/or target magnet 205 in the first direction by maintaining a position of angle sensor 215 and target magnet 205. For example, alignment device 220 may determine (without repositioning target magnet 205) that the value of the first ADC signal value satisfies the condition, indicating that target magnet 205 and angle sensor 215 are optimally or near-optimally aligned along the first direction. In such a case, alignment device 220 may not cause target magnet 205 and/or angle sensor 215 to be repositioned. In other words, when the value of the first ADC signal value satisfies the condition, alignment device 220 may cause a position of target magnet 205 and angle sensor 215 along the first direction to be maintained.

As further shown in FIG. 9, process 900 may include switching the angle sensor from the homogeneous test mode to the differential mode and rotating the target magnet to a second angular position relative to the angle sensor (block 950). For example, alignment device 220 may switch angle sensor 215 from the homogeneous test mode to the differential mode, and may rotate target magnet 205 to a second angular position relative to angle sensor 215.

In some implementations, alignment device 220 may cause angle sensor 215 to switch to the differential mode from the homogeneous test mode. For example, alignment device 220 may provide, to angle sensor 215, information (e.g., an instruction) indicating that angle sensor 215 is to operate in the differential mode, and angle sensor 215 may be configured accordingly (e.g., by causing switches 420 of sensing component 310 to be configured as described in association with FIG. 5A).

In some implementations, alignment device 220 may identify the second angular position based on a set of ADC signals obtained from angle sensor 215 while angle sensor 215 is operating in the differential mode. In some implementations, the second angular position is a 135° angular position of target magnet 205 relative to angle sensor 215, or a 315° angular position of target magnet 205 relative to angle sensor 215. In other words, in some implementations, the second angular position differs from the first angular position by approximately 90°. In some implementations, at the second angular position, a magnetic axis of target magnet 205 is approximately aligned with another pair of sensing elements 410 of sensing component 310 on the x-y plane (e.g., a pair of sensing elements 410 different from that pair of sensing elements 410 with which the magnetic axis is aligned while target magnet 205 is in the first angular position).

As further shown in FIG. 9, process 900 may include switching the angle sensor from the differential mode to the homogeneous test mode (block 960). For example, alignment device 220 may switch angle sensor 215 from the differential mode to the homogeneous test mode.

In some implementations, alignment device 220 may cause angle sensor 215 to switch to the homogeneous test mode from the differential mode. For example, alignment device 220 may provide, to angle sensor 215, information (e.g., an instruction) indicating that angle sensor 215 is to operate in the homogeneous test mode, and angle sensor 215 may be configured accordingly (e.g., by causing switches 420 of sensing component 310 to be configured as described in association with FIG. 5B).

As further shown in FIG. 9, process 900 may include selectively positioning the angle sensor and/or the target magnet in a second direction such that a value of a second ADC signal satisfies the condition (block 970). For example, alignment device 220 may selectively position angle sensor 215 and/or target magnet 205 in a second direction such that a value of the second ADC signal satisfies the condition.

In some implementations, the second ADC signal is a signal that measures the orthogonal angular position that is orthogonal to the second angular position. For example, when target magnet 205 is in the second angular position such that the magnetic axis of target magnet 205 is aligned with one pair of sensing elements 410 of sensing component 310, the second ADC signal is an ADC signal provided by ADC 320 associated with the other pair of sensing elements 410.

In some implementations, alignment device 220 may selectively position angle sensor 215 and/or target magnet 205 based on whether a value of the second ADC signal value satisfies the condition. In some implementations, the condition may be whether the value of the second ADC signal value is minimized, or whether the value of the ADC signal is at or below a particular value, as described above in association with example process 700.

In some implementations, alignment device 220 may selectively position angle sensor 215 or target magnet 205 by positioning angle sensor 215 and/or target magnet 205 along the second direction in order to reduce the value of the second ADC signal. For example, alignment device 220 may reposition angle sensor 215 and/or target magnet 205 (back-and-forth) along the second direction while monitoring the second ADC signal. Here, the second direction is a direction on the x-y plane that is substantially perpendicular to the magnetic axis of target magnet 205 while target magnet 205 is in the second angular position. In some implementations, alignment device 220 may reposition angle sensor 215 and/or target magnet 205 along the second direction until alignment device 220 determines that a value of the second ADC signal satisfies the condition (e.g., is minimized, or is at or below a particular value). When alignment device 220 determines that the value of the second ADC signal satisfies the condition, alignment device 220 may stop repositioning angle sensor 215 and target magnet 205 in the second direction.

In some implementations, the selective positioning of angle sensor 215 and/or target magnet 205 in the second direction may include maintaining a position of angle sensor 215 and target magnet 205. For example, alignment device 220 may determine (without repositioning target magnet 205) that the value of the second ADC signal value satisfies the condition, indicating that target magnet 205 and angle sensor 215 are optimally or near-optimally aligned along the second direction. In such a case, alignment device 220 may not cause target magnet 205 and/or angle sensor 215 to be repositioned. In other words, when the value of the second ADC signal value satisfies the condition, alignment device 220 may cause a position of target magnet 205 and angle sensor 215 along the second direction to be maintained.

Notably, example process 900 does not require a full rotation of target magnet 205 and therefore may be desirable when, for example, a full rotation is not possible or would add cost or complexity to the manufacturing process.

In some implementations, after aligning angle sensor 215 and target magnet 205, alignment device 220 may selectively adjust an airgap between angle sensor 215 and target magnet 205 in a manner similar to that described above in association with example process 700.

In some implementations, after alignment device 220 selectively repositions angle sensor 215 and/or target magnet 205 such that optimal or near-optimal alignment has been reached, alignment device 220 may provide an indication that angle sensor 215 is aligned with target magnet 205, as described above.

Although FIG. 9 shows example blocks of process 900, in some implementations process 900 may include additional blocks, fewer blocks, different blocks, or differently arranged blocks than those depicted in FIG. 9. Additionally, or alternatively, two or more of the blocks of process 900 may be performed in parallel.

Figure 10A:
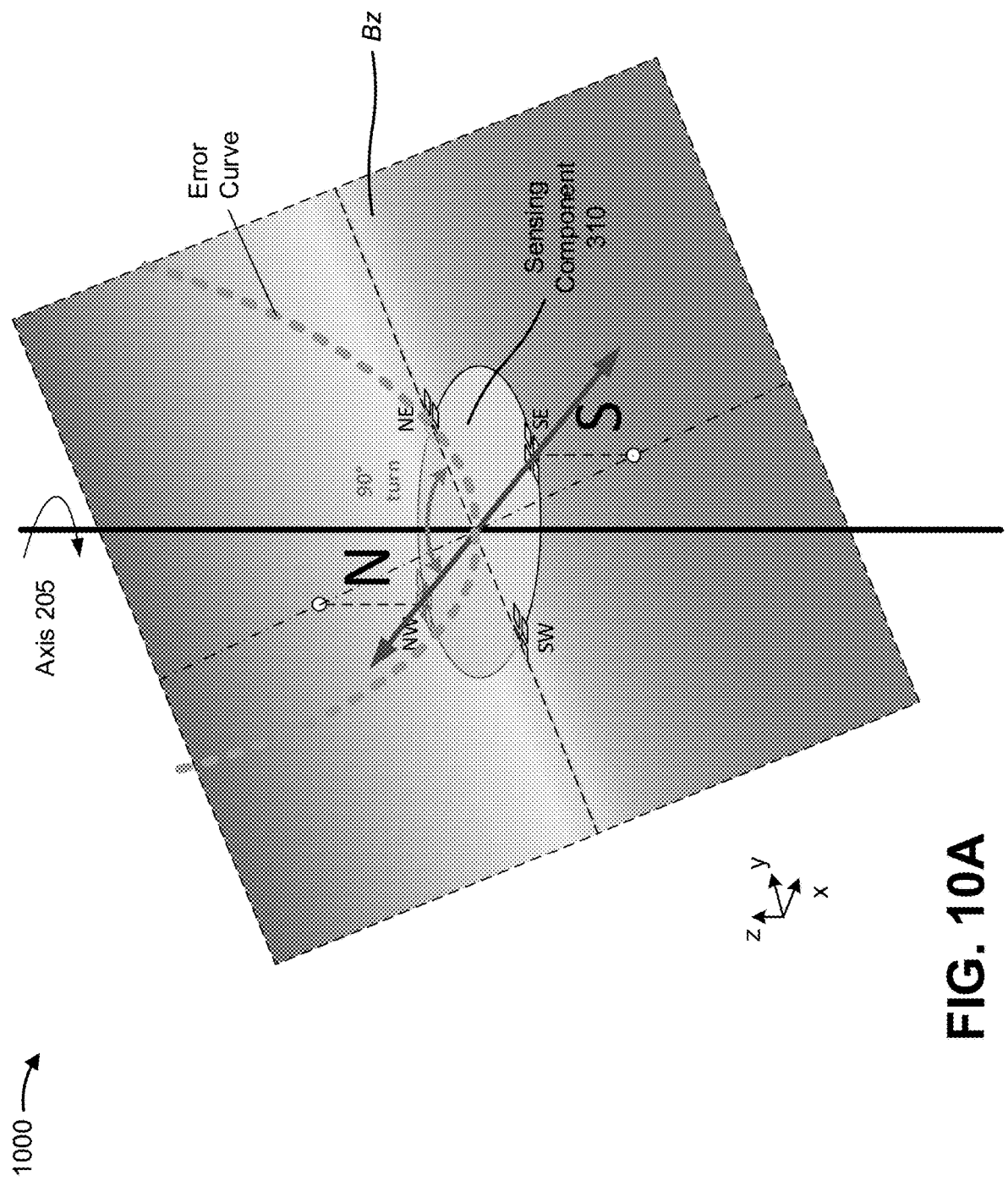
FIGS. 10A and 10B are diagrams illustrating an example of performing alignment between an angle sensor and a target magnet using the example process of FIG. 9.
Figure 10B:
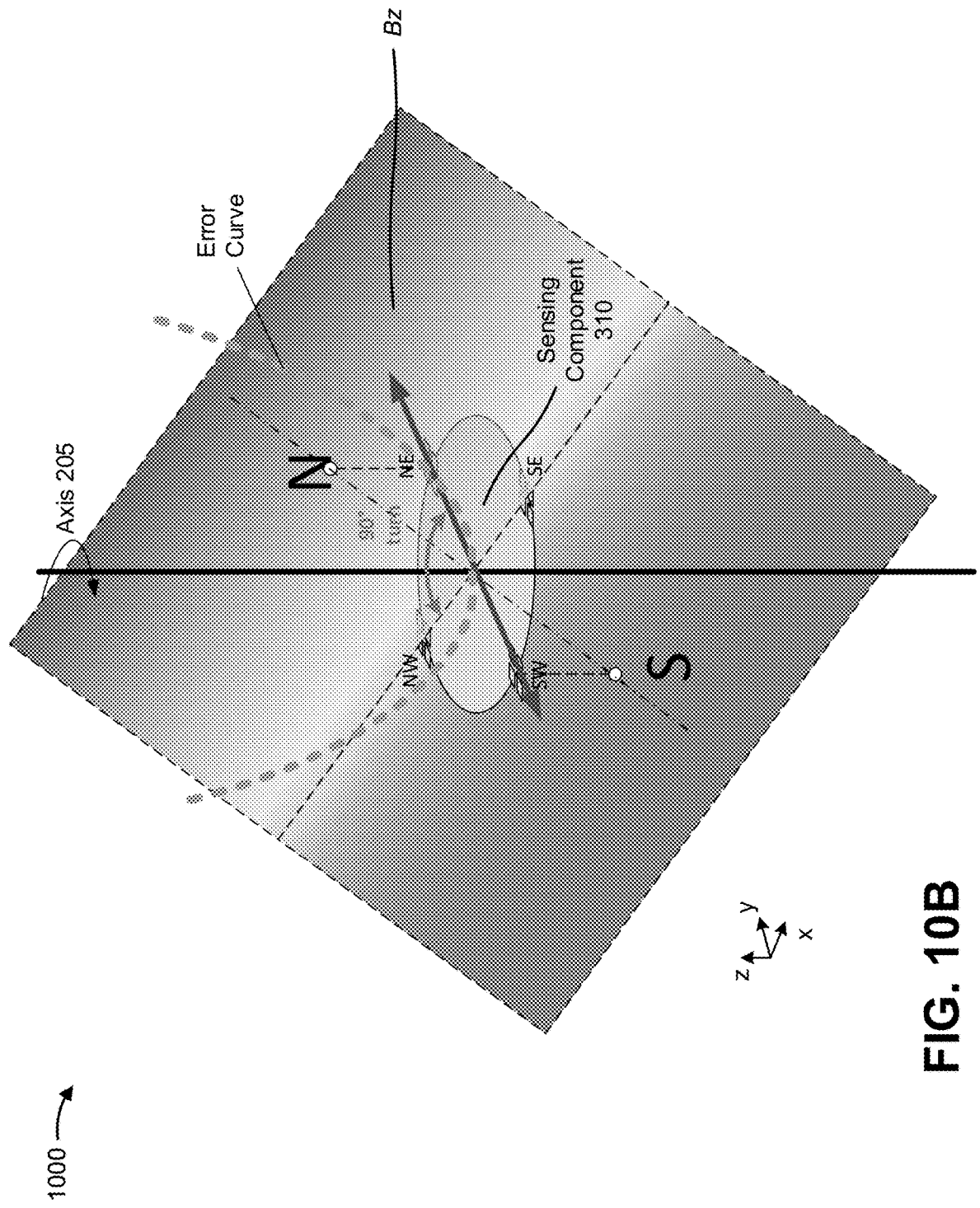

FIGS. 10A and 10B are diagrams illustrating an example 1000 of performing alignment between angle sensor 215 and target magnet 205 using example process 900.

In FIG. 10A, target magnet 205 (not shown) produces a magnetic field at sensing component 310. A magnetic flux at sensing component 310 in the z-direction is represented by the sloped plane identified as Bz in FIG. 10A. In FIG. 10A, target magnet 205 is rotated such that target magnet 205 is at a first angular position relative to sensing component 310 (e.g., angle sensor 215) that is operating in a differential mode, as described above. As shown, at the first angular position, a magnetic axis of target magnet 205 is approximately aligned with a first pair of sensing elements 410 of sensing component 310 on the x-y plane (e.g., the sensing element 410 identified as SW and the sensing element 410 identified as NE).

Next, alignment device 220 may switch angle sensor 215 to the homogeneous test mode, and may identify a first ADC signal that corresponds to an orthogonal angular position that is orthogonal to the first angular position. For example, with reference to FIG. 10A, alignment device 220 may identify the first ADC signal as an ADC signal resulting from outputs of a second pair of sensing elements 410 of sensing component 310 (e.g., the sensing element 410 identified as SE and the sensing element 410 identified as NW).

Here, alignment device 220 may selectively position angle sensor 215 and/or target magnet 205 along a first direction such that a value of the first ADC signal satisfies a condition. For example, alignment device 220 may determine whether a value of the first ADC signal satisfies a condition. If alignment device 220 determines that the value of the first ADC signal does not satisfy the condition, then alignment device 220 may reposition angle sensor 215 (including sensing component 310) and/or target magnet 205 along the first direction. Here, the first direction is a direction on the x-y plane that is substantially perpendicular to the magnetic axis of target magnet 205 while target magnet 205 is in the first angular position. The first direction is identified by a double-ended arrow in FIG. 10A. As described above, alignment device 220 may reposition angle sensor 215 and/or target magnet 205 along the first direction until alignment device 220 determines that a value of the first ADC signal satisfies the condition.

Next, as shown in FIG. 10B, alignment device 220 may switch angle sensor 215 to the differential mode and may rotate target magnet 205 to a second angular position relative to angle sensor 215 (e.g., an angular position that is 90° away from the first angular position). As shown, at the second angular position, a magnetic axis of target magnet 205 is approximately aligned with the second pair of sensing elements 410 of sensing component 310 on the x-y plane (e.g., the sensing element 410 identified as NW and the sensing element 410 identified as SE).

Here, alignment device 220 may switch angle sensor 215 to the homogeneous test mode, and may identify a second ADC signal. For example, with reference to FIG. 10B, alignment device 220 may identify the second ADC signal as an ADC signal resulting from outputs of the first pair of sensing elements 410 of sensing component 310 (e.g., the sensing element 410 identified as SW and the sensing element 410 identified as NE).

Here, alignment device 220 may selectively position angle sensor 215 and/or target magnet 205 along a second direction such that a value of the second ADC signal satisfies the condition. For example, alignment device 220 may determine whether a value of the second ADC signal satisfies the condition. If alignment device 220 determines that the value of the second ADC signal does not satisfy the condition, then alignment device 220 may reposition angle sensor 215 (including sensing component 310) and/or target magnet 205 along the second direction. Here, the second direction is a direction on the x-y plane that is substantially perpendicular to the magnetic axis of target magnet 205 while target magnet 205 is in the second angular position. The second direction is identified by a double-ended arrow in FIG. 10B. As described above, alignment device 220 may reposition angle sensor 215 and/or target magnet 205 along the second direction until alignment device 220 determines that a value of the second ADC signal satisfies the condition.

In this way, alignment device 220 may use angle sensor 215, operating in a homogeneous test mode, to achieve optimal or near-optimal alignment of angle sensor 215 and target magnet 205 without a full rotation of target magnet 205.

As indicated above, FIGS. 10A and 10B are provided merely as examples. Other examples may differ from what was described with regard to FIGS. 10A and 10B.

The foregoing disclosure provides illustration and description, but is not intended to be exhaustive or to limit the implementations to the precise form disclosed. Modifications and variations are possible in light of the above disclosure or may be acquired from practice of the implementations.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
    obtaining, by an alignment device, a set of analog-to-digital converter (ADC) signals provided by an angle sensor operating in a homogeneous test mode,
        wherein the set of ADC signals is associated with a rotation of a target magnet relative to the angle sensor;
    identifying, by the alignment device, a maximum ADC signal value based on the set of ADC signals; and
    selectively positioning, by the alignment device, at least one of the angle sensor or the target magnet based on the maximum ADC signal value.

2. The method of claim 1, wherein, when the angle sensor is operating in the homogeneous test mode, differential magnetic field components, present at sensing elements of the angle sensor, are to cancel out in the set of ADC signals.

3. The method of claim 1, wherein the rotation of the target magnet is a rotation of at least approximately 360 degrees.

4. The method of claim 1, wherein the angle sensor or the target magnet is selectively positioned based on whether the maximum ADC signal value satisfies a condition.

5. The method of claim 4, wherein the condition is whether the maximum ADC signal value is minimized.

6. The method of claim 1, wherein selectively positioning the angle sensor or the target magnet comprises:
    rotating the target magnet to an angular position that corresponds to the maximum ADC signal value, and
    positioning the angle sensor or the target magnet along a direction in order to reduce the maximum ADC signal value.

7. The method of claim 1, further comprising:
    obtaining another set of ADC signals provided by the angle sensor operating in the homogeneous test mode,
        wherein the other set of ADC signals is associated with another rotation of the target magnet relative to the angle sensor;
    identifying another maximum ADC signal value based on the other set of ADC signals; and
    selectively positioning at least one of the angle sensor or the target magnet based on the other maximum ADC signal value.

8. The method of claim 1, wherein selectively positioning at least one of the angle sensor or the target magnet comprises:
    maintaining a position of the angle sensor and the target magnet.

9. The method of claim 1, further comprising:
    providing an indication that the angle sensor is aligned with the target magnet.

10. The method of claim 1, further comprising:
    switching the angle sensor to a differential mode; and selectively adjusting an airgap between the target magnet and the angle sensor based on another set of ADC signals provided by the angle sensor while operating in the differential mode.

11. An alignment device, comprising:
one or more memories; and
one or more processors, communicatively coupled to the one or more memories, configured to:
obtain a set of analog-to-digital converter (ADC) signals provided by an angle sensor operating in a homogeneous test mode,
wherein the set of ADC signals is associated with a rotation of a target magnet relative to the angle sensor;
identify a maximum ADC signal value based on the set of ADC signals; and
selectively position at least one of the angle sensor or the target magnet based on the maximum ADC signal value.

12. The alignment device of claim 11, wherein, when the angle sensor is operating in the homogeneous test mode, differential magnetic field components, present at sensing elements of the angle sensor, are to cancel out in the set of ADC signals.

13. The alignment device of claim 11, wherein the rotation of the target magnet is a rotation of at least approximately 360 degrees.

14. The alignment device of claim 11, wherein the angle sensor or the target magnet is selectively positioned based on whether the maximum ADC signal value satisfies a condition.

15. The alignment device of claim 14, wherein the condition is whether the maximum ADC signal value is minimized.

16. The alignment device of claim 11, wherein the one or more processors, when selectively positioning the angle sensor or the target magnet, are configured to:
rotate the target magnet to an angular position that corresponds to the maximum ADC signal value, and
position the angle sensor or the target magnet along a direction in order to reduce the maximum ADC signal value.

17. The alignment device of claim 11, wherein the one or more processors are further configured to:
obtain another set of ADC signals provided by the angle sensor operating in the homogeneous test mode,
wherein the other set of ADC signals is associated with another rotation of the target magnet relative to the angle sensor;
identify another maximum ADC signal value based on the other set of ADC signals; and
selectively position at least one of the angle sensor or the target magnet based on the other maximum ADC signal value.

18. The alignment device of claim 11, wherein the one or more processors are further configured to:
provide an indication that the angle sensor is aligned with the target magnet.

19. The alignment device of claim 11, wherein the one or more processors are further configured to:
switch the angle sensor to a differential mode; and
selectively adjust an airgap between the target magnet and the angle sensor based on another set of ADC signals provided by the angle sensor while operating in the differential mode.

20. A non-transitory computer-readable medium storing a set of instructions, the set of instructions comprising:
one or more instructions that, when executed by one or more processors of an alignment device, cause the alignment device to:
obtain a set of analog-to-digital converter (ADC) signals provided by an angle sensor operating in a homogeneous test mode,
wherein the set of ADC signals is associated with a rotation of a target magnet relative to the angle sensor;
identify a maximum ADC signal value based on the set of ADC signals; and
selectively position at least one of the angle sensor or the target magnet based on the maximum ADC signal value.

* * * * *